United States Patent
Roberson et al.

(10) Patent No.: US 11,644,862 B2
(45) Date of Patent: May 9, 2023

(54) SYSTEM AND METHOD FOR SYNCHRONIZING SENSING SIGNALS OF INTEGRATED CIRCUIT CHIPS

(71) Applicant: Synaptics Incorporated, San Jose, CA (US)

(72) Inventors: Jeremy Roberson, San Jose, CA (US); David Sobel, Los Altos, CA (US)

(73) Assignee: Synaptics Incorporated, San Jose, CA (US)

( * ) Notice: Subject to any disclaimer, the term of this patent is extended or adjusted under 35 U.S.C. 154(b) by 66 days.

(21) Appl. No.: 17/199,786

(22) Filed: Mar. 12, 2021

(65) Prior Publication Data

US 2021/0200259 A1 Jul. 1, 2021

Related U.S. Application Data

(63) Continuation of application No. 16/178,202, filed on Nov. 1, 2018, now Pat. No. 10,983,553.

(60) Provisional application No. 62/722,794, filed on Aug. 24, 2018.

(51) Int. Cl.
   *G06F 1/12* (2006.01)
(52) U.S. Cl.
   CPC ..................................... *G06F 1/12* (2013.01)
(58) Field of Classification Search
   None
   See application file for complete search history.

(56) References Cited

U.S. PATENT DOCUMENTS

| 8,890,817 B2 | 11/2014 | Wilson et al. |
| 9,298,325 B2 | 3/2016 | Shepelev et al. |
| 9,405,415 B2 | 8/2016 | Morein et al. |
| 9,552,089 B2 | 1/2017 | Lukanc et al. |
| 2008/0158177 A1 | 7/2008 | Wilson et al. |
| 2009/0251427 A1 | 10/2009 | Hung et al. |
| 2009/0251437 A1* | 10/2009 | Hung .................. G06F 3/04166 345/174 |
| 2010/0328237 A1 | 12/2010 | Chang et al. |
| 2010/0328274 A1* | 12/2010 | Noguchi .............. G09G 3/3674 345/204 |
| 2012/0243559 A1* | 9/2012 | Pan ....................... H04J 3/1605 370/503 |
| 2012/0256852 A1* | 10/2012 | Van Antwerpen .... G06F 3/0416 345/173 |
| 2013/0009899 A1 | 1/2013 | Gettemy et al. |

(Continued)

OTHER PUBLICATIONS

U.S. Appl. No. 16/178,202, filed Nov. 1, 2018.

*Primary Examiner* — Danny Chan
(74) *Attorney, Agent, or Firm* — Leydig, Voit & Mayer, Ltd.

(57) ABSTRACT

A system and method for synchronizing multiple integrated circuit (IC) chips for an input device having a display device integrated with a capacitive sensing device. A first one of the IC chips is a master IC chip and a second one of the IC chips is a slave IC chip. The master IC chip is configured to transmit synchronization signals to and from the slave IC chip, such that capacitive frames are acquired by each of the IC chips at substantially the same time, the initiation of the sensing signals is synchronized for each of the IC chips and the clock signals of the slave IC chips are synchronized with the clock signal of the master IC chip.

20 Claims, 22 Drawing Sheets

(56) References Cited

U.S. PATENT DOCUMENTS

| | | | |
|---|---|---|---|
| 2014/0111443 A1* | 4/2014 | Guo | G06F 3/0416 |
| | | | 345/173 |
| 2014/0347320 A1 | 11/2014 | Ribeiro et al. | |
| 2015/0324036 A1 | 11/2015 | Schwartz et al. | |
| 2016/0124881 A1* | 5/2016 | Zhang | G06F 5/065 |
| | | | 710/110 |
| 2016/0232852 A1 | 8/2016 | An et al. | |
| 2016/0253021 A1 | 9/2016 | Syu et al. | |
| 2017/0187551 A1 | 6/2017 | Lukanc et al. | |
| 2018/0107338 A1* | 4/2018 | Chung | G06F 3/04184 |
| 2019/0196644 A1 | 6/2019 | Chung | |
| 2019/0305865 A1 | 10/2019 | Loinaz | |
| 2021/0090528 A1* | 3/2021 | Zheng | G09G 5/397 |

\* cited by examiner

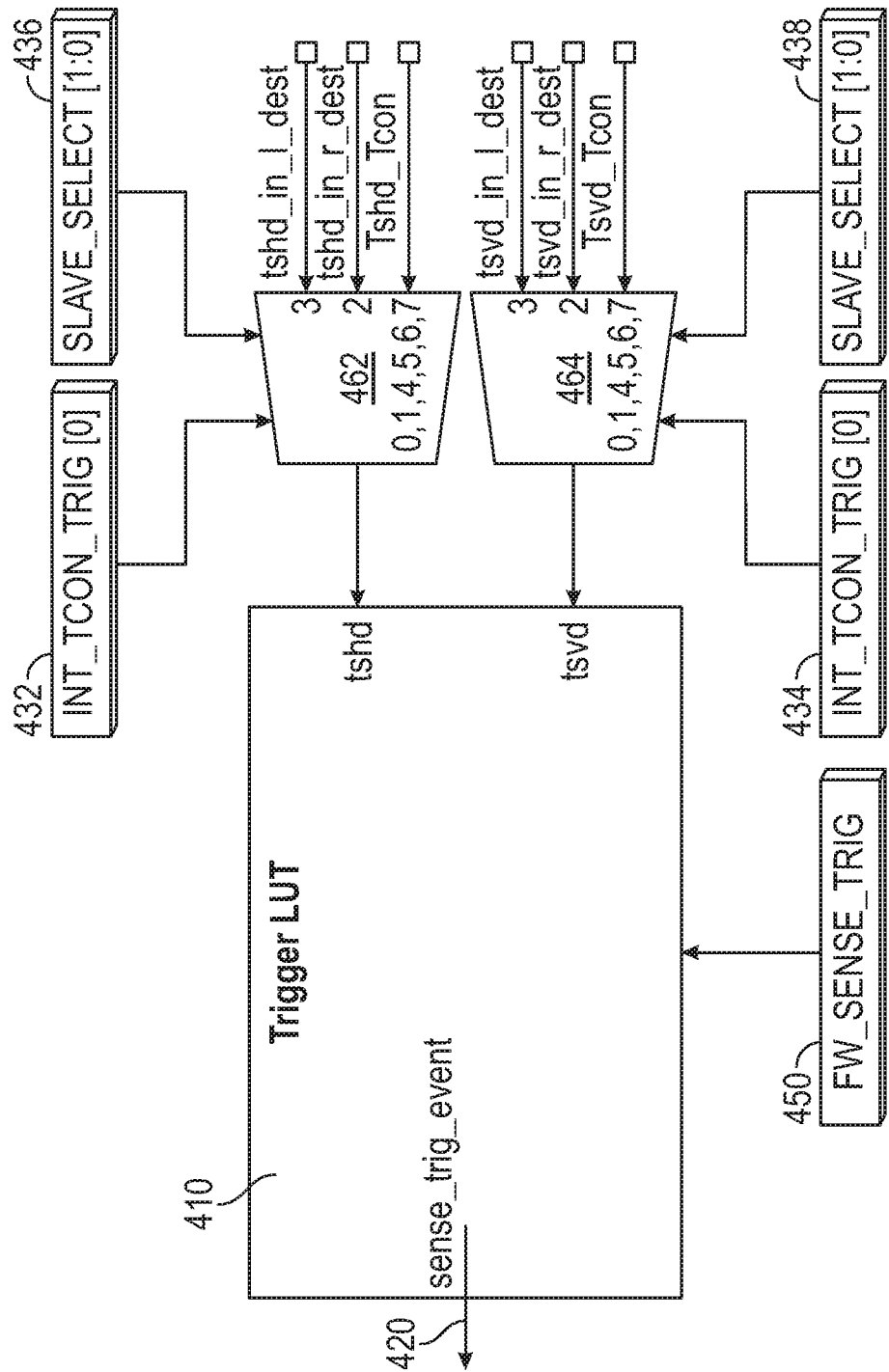

SYSTEM AND METHOD FOR SYNCHRONIZING SENSING SIGNALS OF INTEGRATED CIRCUIT CHIPS

CROSS-REFERENCE TO RELATED APPLICATIONS

This application is a continuation of U.S. patent application Ser. No. 16/178,202, filed Nov. 1, 2018, which claims the benefit of U.S. Provisional Patent Application No. 62/722,794, filed Aug. 24, 2018. The aforementioned patent applications are incorporated herein by reference in their entireties.

FIELD

Embodiments disclosed herein generally relate to electronic devices, and more specifically, to synchronizing integrated circuit chips.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones or vehicles (e.g., automobiles).

SUMMARY

In one embodiment, an input device comprises a plurality of sensor electrodes, a master integrated circuit (IC) chip, and a first slave IC chip. The master integrated circuit (IC) chip is communicatively coupled to a plurality of sensor electrodes and is configured to generate a vertical timing signal and a horizontal timing signal, and initiate acquisition of a first capacitive frame based on at least one of the vertical timing signal and the horizontal timing signal by driving the plurality of sensor electrodes with a first sensing signal comprising one or more sensing bursts. The first slave IC chip is communicatively coupled with the master IC chip and to the plurality of sensor electrodes, and is configured to receive the vertical timing signal and the horizontal timing signal from the master IC chip, and initiate acquisition of a second capacitive frame based on at least one of the vertical timing signal and the horizontal timing signal by driving the plurality of sensor electrodes with a second sensing signal comprising one or more sensing bursts.

In one embodiment, a method for synchronizing IC chips comprises generating, with a master IC chip, a vertical timing signal and a horizontal timing signal, transmitting the vertical timing signal and the horizontal timing signal from the master IC chip to a slave IC chip, initiating acquisition of first sensing measurements by the master IC chip based on at least one of the vertical timing signal and the horizontal timing signal, and initiating acquisition of second sensing measurements by the slave IC chip based on at least one of the vertical timing signal and the horizontal timing signal.

In one embodiment, a processing system for a display device having an integrated capacitive sensing device comprises a master IC chip communicatively coupled to a plurality of sensor electrodes, and a slave IC chip. The master IC chip is configured to generate a vertical timing signal and a horizontal timing signal, and initiate acquisition of a first capacitive frame based on at least one of the vertical timing signal and the horizontal timing signal by driving the plurality of sensor electrodes with a first sensing signal corresponding to one or more sensing bursts. The slave IC chip is communicatively coupled with the master IC chip and to the plurality of sensor electrodes, and is configured to receive the vertical timing signal and the horizontal timing signal from the master IC chip, and initiate acquisition of a second capacitive frame based on at least one of the vertical timing signal and the horizontal timing signal by driving the plurality of sensor electrodes with a second sensing signal corresponding to one or more sensing bursts.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 4 is a block diagram of a synchronization device, according to one or more embodiments.

FIGS. 7A-1, 7A-2, 7A-3, 7A-4, 7B-1, 7B-2, 7B-3 and 7B-4 illustrate a block diagram for synchronizing chips, according to one or more embodiments.

Figure 1:
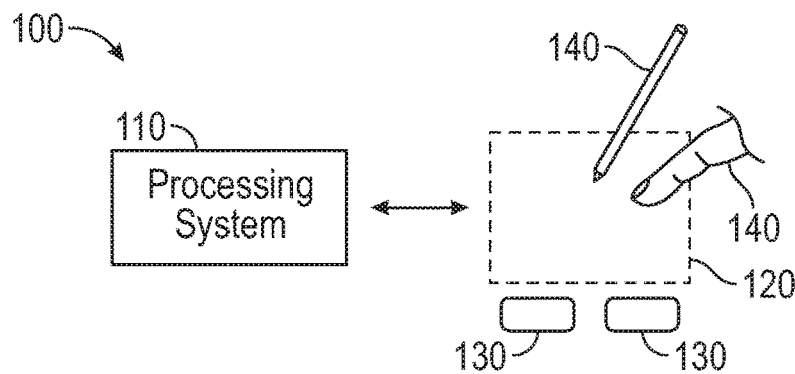
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In one or more embodiments, an input device includes multiple display driver integrated circuit chips configured for display updating and performing capacitive sensing. Each of the display driver integrated circuit chips is configured to drive sensor electrodes and update display electrodes of a common display panel, and artifacts and/or errors in the sensing data may occur if the display driver integrated circuit chips are not synchronized with each other. In the following description, various systems and methods for synchronizing display driver integrated circuit chips are described.

Turning now to the figures, FIG. 1 is a block diagram of an exemplary input device 100, in accordance with embodiments of the disclosure. The input device 100 may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g. a touch surface, of the input device 100: contact with an input surface of the input device 100 coupled with some amount of applied force or pressure; and/or a combination thereof. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g. system ground, and by detecting the capacitive coupling between the sensor electrodes and input objects.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). Transmitter sensor electrodes may be modulated relative to a reference voltage, e.g., system ground, to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference, e.g. other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen. The active area of the display screen may correspond to a portion of the display screen where images are updated. In one or more embodiments, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110. The display screen may also be referred to as a display panel.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
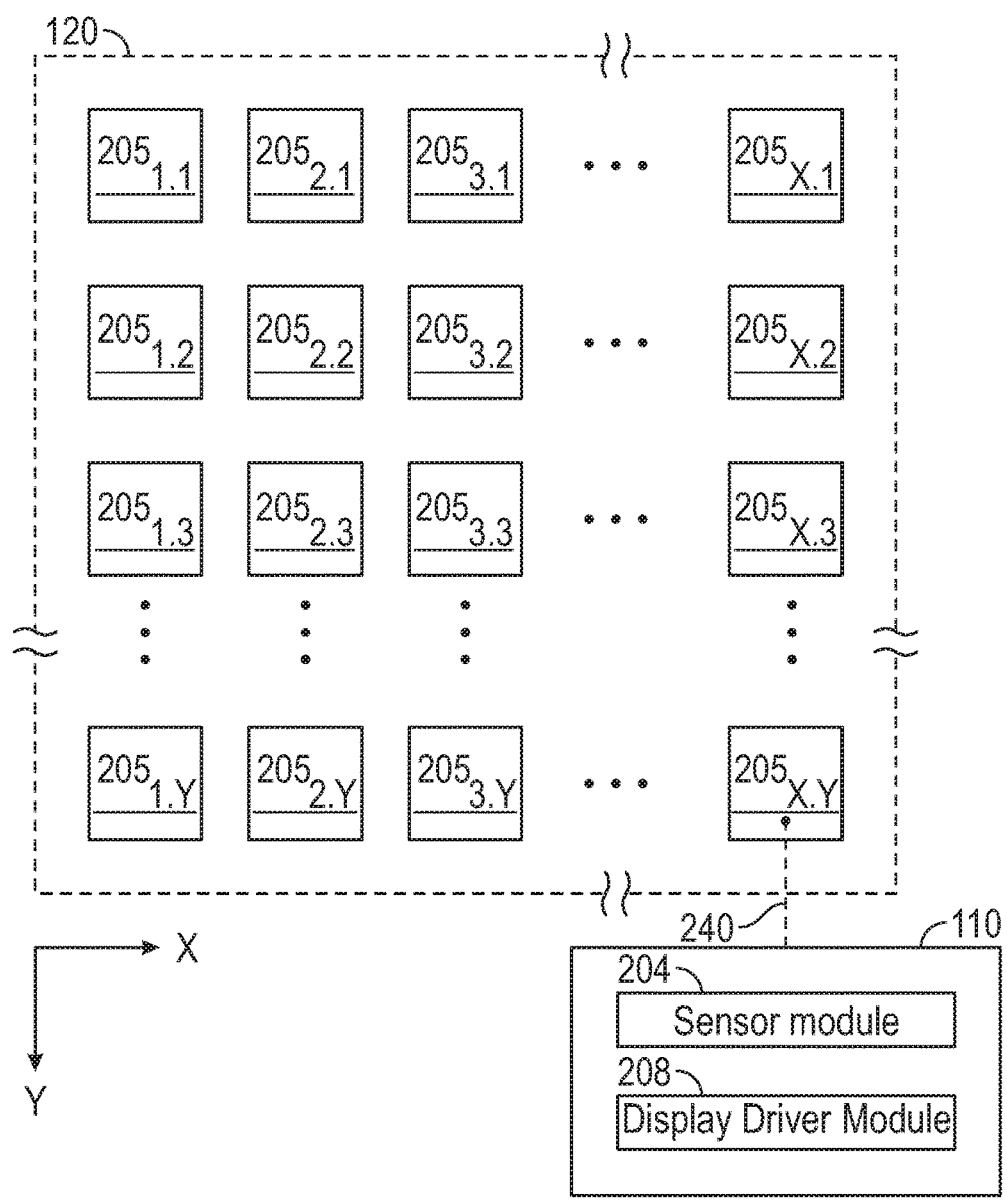
FIG. 2 illustrates an example display device and sensor device, according to one or more embodiments.

FIG. 2 shows a portion of an exemplary pattern of sensor electrodes 205 configured to sense in the sensing region 120 associated with a pattern, according to some embodiments. For clarity of illustration and description, FIG. 2 presents the regions of the capacitive sensor electrodes 205 in a pattern of simple rectangles; however, in other embodiments, the sensor electrodes 205 may be disposed in other patterns and may have other shapes. For example, one or more of senor electrodes 205 may span the entirety of the sensing region 120 in a first direction (e.g., along the X axis) and another one or more of sensor electrodes may span the entity of the sensing region in a second direction (along the Y axis) different than the first direction. Further, in various embodiments, the sensor electrodes 205 may be disposed as overlapping or non-overlapping rows and columns of sensor electrodes.

In one embodiment, the sensor electrodes 205 form areas of localized capacitance. The areas of localized capacitance may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120, and thus may be used as an indicator of the presence of the input object in the sensing region 120 of the input device.

The exemplary pattern comprises an array of sensor electrodes $205_{X,Y}$ arranged in X columns and Y rows in a common plane, wherein X and Y are positive integers, although one of X and Y may be zero. It is contemplated that the pattern of sensing electrodes 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes 205 may be any shape such as circular, rectangular, diamond, star, square, noncovex, convex, nonconcave concave, etc. As shown here, the sensor electrodes 205 are coupled to the processing system 110 and utilized to determine the presence of (or lack thereof) an input object in the sensing region 120.

In a first mode of operation, at least one sensor electrode may be utilized to detect the presence of an input object via absolute sensing techniques. A sensor module 204 in processing system 110 is configured to drive a sensor electrode using a trace 240 in each sensor electrode 205 with a an absolute capacitive sensing signal and measure a capacitance between the sensor electrode and the input object based on the absolute capacitive sensing signal, which is utilized by the processing system 110 or other processor to determine the position of the input object. The absolute capacitive sensing signal may be a modulated signal comprising a varying voltage. In one embodiment, the absolute capacitive sensing signal includes a plurality of pulses (e.g., a plurality of positive and negative voltage transitions). Further, a positive and negative voltage transition may be referred to as a burst, and the absolute capacitive sensing signal includes one or more bursts.

One or more of sensor electrodes 205 may be ohmically isolated from another one or more of sensor electrodes 205. Further, one or more insulators separate the sensor electrodes and prevent them from electrically shorting to each other.

In a second mode of operation, sensor electrodes 205 are utilized to detect the presence of an input object via transcapacitance sensing techniques. That is, processing system 110 may drive at least one sensor electrode 205 with a transmitter signal and receive resulting signals using one or more of the other sensor electrodes 205, where a resulting signal comprising effects corresponding to the transmitter signal. The resulting signal is utilized by the processing system 110 or other processor to determine the position of the input object. The sensor electrodes that are driven with the transmitter signal are modulated by the transmitter signal relative to the sensor electrodes that receive the resulting signals. In one embodiment, both the sensor electrodes that are driven with the transmitter signal and the sensor electrodes that receive the resulting signals are modulated. In one embodiment, the transmitter signal includes a plurality of pulses (e.g., a plurality of positive and negative voltage transitions). Further, a positive and negative voltage transition may be referred to as a burst, and the transmitter signal includes one or more bursts.

The term "sensing signal" may refer to either an absolute capacitive sensing signal or a transmitter signal.

The input device 100 may be configured to operate in any one of the modes described above. The input device 100 may also be configured to switch between the two modes described above.

In some embodiments, the sensor electrodes 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" sensor electrodes 205 to determine these capacitive coupling includes driving with an absolute capacitive sensing signal and measuring the absolute capacitance of one or more of the sensor electrodes. In another embodiment, the sensor electrodes may be operated such that the absolute capacitive sensing signal is driven on a sensor electrode 205 at the same time. In such embodiments, an absolute capacitive measurement may be obtained from each of the one or more sensor electrodes 205 simultaneously. In one embodiment, the input device 100 simultaneously drives a sensor electrode in a plurality of sensor electrodes 205 and measures an absolute capacitive measurement for each of the sensor electrodes 205 in the same sensing cycle. In various embodiments, processing system 110 may be configured to selectively drive and receive with a portion of sensor electrodes. For example, the sensor electrodes may be selected based on, but not limited to, an application running on the host processor, a status of the input device, an operating mode of the sensing device and a determined location of an input device. The host processor may be a central processing unit or any other processor of an electronic device.

A set of measurements from the sensor electrodes 205 form a capacitive image or capacitive frame representative of the capacitive couplings at the sensor electrodes 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes 205 include one or more display electrodes used in updating the display of the display screen. In one or more embodiments, the display electrodes comprise one or more segments of a common voltage electrode, also referred to as a Vcom electrode, a source drive line (or source electrode), gate line (or gate electrode), an anode electrode or cathode electrode, or any other display element. These display electrodes may be disposed on an appropriate display screen substrate. For example, in display screens such as In Plane Switching (IPS) and Plane to Line Switching (PLS) Organic Light Emitting Diode (OLED), the display electrodes may be disposed on a transparent substrate, e.g., a glass substrate, TFT glass, or any other transparent material). In other embodiments, in display screens such as Patterned Vertical Alignment (PVA) and Multi-domain Vertical Alignment (MVA), the display electrodes may be disposed on the bottom of a color filter glass. In one or more embodiments, the display electrodes may be disposed over an emissive layer of an OLED display. In such embodiments, an electrode that is used as both a sensor electrode and a display electrode can also be referred to as a combination electrode, since it performs multiple functions. In one embodiment, the display electrodes may be gate electrodes used to select subpixels of a display line for updating, source electrodes configured to drive the data signals onto the subpixels for updating and/or a Vcom electrode or electrodes. The source electrodes may be coupled to columns of subpixels and the gate electrodes may be coupled to rows of subpixels.

Continuing to refer to FIG. 2, in various embodiments, the processing system 110 coupled to the sensing electrodes may include one or more integrated circuit (IC) chips where each IC chip includes a sensor module 204 and a display driver module 208. In one embodiment, the sensor module 204 comprises circuitry configured to drive a transmitter signal or an absolute capacitive sensing signal onto the sensing electrodes and receive resulting signals with the sensing electrodes during periods in which input sensing is desired. Further, the processing system may include multiple IC chips, where each IC chip may include a sensor module 204 and a display driver module 208.

In one or more embodiments, the sensor module 204 comprises a transmitter module including circuitry configured to drive a transmitter signal onto the sensing electrodes during periods in which input sensing is desired. In one or more embodiments, the transmitter signal is modulated and contains one or more bursts over a period of time allocated for input sensing. The transmitter signal may have an amplitude, frequency and voltage which may be changed to obtain more robust location information of the input object in the sensing region 120. The absolute capacitive sensing signal may be the same or different from the transmitter signal used in transcapacitance sensing. The sensor module 204 may be selectively coupled to one or more of the sensor electrodes 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments, the sensor module 204 comprises sensor circuitry (e.g., sensor circuitry 206 of FIG. 3) and the sensor module is configured to receive a resulting signal with the sensing electrodes comprising effects corresponding to the transmitter signal during periods in which input sensing is desired. In one or more embodiments, the sensor module 204 is configured to receive a resulting signal from a sensor electrode that is driven with an absolute capacitive sensing signal to determine changes in absolute capacitance between the sensor electrode and an input object. In one or more embodiments, the sensor module 204 determines a position of the input object in the sensing region 120. In one or more embodiments, the sensor module 204 provides a signal including information indicative of the resulting signal to another module or processor such as a determination module of the processing system 110 or a processor of the electronic device, e.g., a host processor, for determining the position of the input object in the sensing region 120. In one or more embodiments, the sensor circuitry of the sensor module comprises receiver circuitry, where the receiver circuitry may include a plurality of analog front ends (AFEs).

In one or more embodiments, capacitive sensing or input sensing and display updating may occur during at least partially overlapping periods. Display updating may include updating the voltages on each of the display electrodes during a display frame. During each display frame, each of display line of the display device may be updated. In one embodiment, a display frame may be updated once every 16 ms or at a display frame rate of 60 Hz. In other embodiments, other display frame rates may be utilized. For example, display frame rates of 48 Hz, 120 Hz, and/or 240 Hz may be utilized. For example, as a combination electrode is driven for display updating, the combination electrode may also be driven for capacitive sensing. Overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

Figure 3:
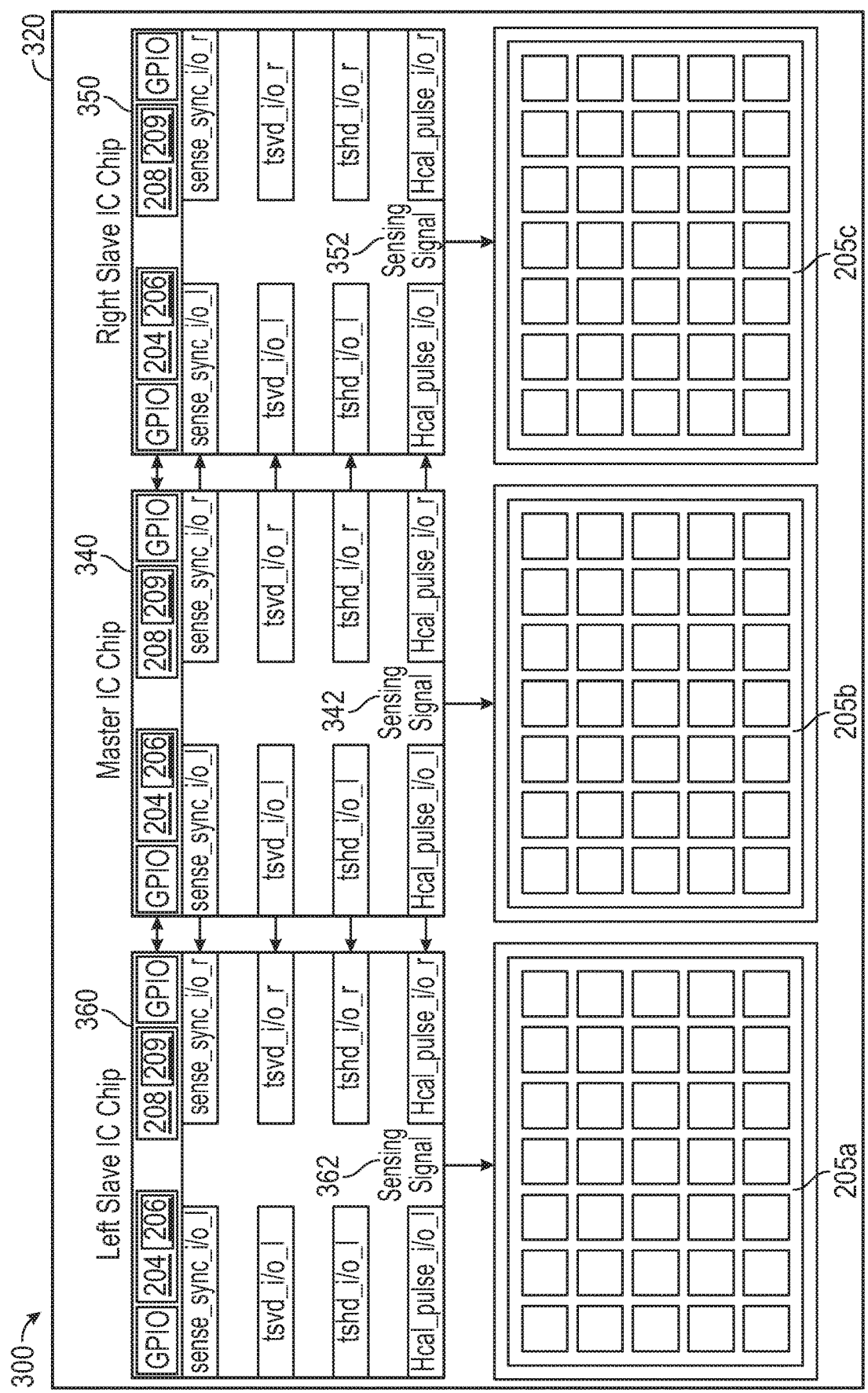
FIG. 3 illustrates multi-chip configuration for driving a display panel, according to one or more embodiments.

FIG. 3 illustrates a multiple IC chip solution for driving a display panel. In one or more embodiments, the display device 300 may be part of an input device (e.g., input device 100) for a vehicle (e.g., automobile). As illustrated, FIG. 3 includes a display device 300 having a display panel with a substrate 320 and display electrodes. In the illustrated embodiment, three IC chips (e.g., the master IC chip 340, the right slave IC Chip 350, and the left slave IC chip 360) are utilized to drive the display panel and perform capacitive sensing. In one embodiment, one or more of the IC chips may be disposed on a first substrate and another one or more of the IC chips may be disposed on a second substrate.

Each of the IC chips may include an instance of the sensor module 204 and the display driver module 208. Further, each of the IC chips may include a timing controller (Tcon) 209 configured to generate timing signals for display updating and capacitive sensing and sensing circuitry 206 configured to perform capacitive sensing with the sensor electrodes 205. In one embodiment, the Tcon 209 is configured to communicate with capacitive sensing circuitry configured to synchronize display updating and capacitive sensing.

In various embodiments, each of the IC chips 340, 350 and 360 includes a plurality of input/output pins. For example, as is illustrated in FIG. 3, IC chips 340, 350, and 360 include input/output pins such as sense_sync_i/o_l, sense_sync_i/o_r, tsvd_i/o_l, tsvd_i/o_r, tshd_i/o_l, tshd_i/o_r, Hcal_pulse_i/o_l, Hcal_pulse_i/o_r, general purpose input/output (GPIO) pins. Input/output pins of an IC chip may be communicatively coupled to associated input/output pins of another IC chip via one or more routing lines disposed on the substrate 320, or in one or more embodiments, between IC chips disposed on different substrates. For example, sense_sync_i/o_l of the master IC chip 340 may be coupled to sense_sync_i/o_r of the left slave IC chip 360, and sense_sync_i/o_r of the master IC chip 340 may be coupled to sense_sync_i/o_l of the right slave IC chip 350. Similarly, for example, tsvd_i/o_l of the master IC chip 340 may be coupled to tsvd_i/o_r of the left slave IC chip 360, and tsvd_i/o_r of the master IC chip 340 may be coupled to tsvd_i/o_l of the right slave IC chip 350. Further, tshd_i/o_l of the master IC chip 340 may be coupled to tshd_i/o_r of the left slave IC chip 360, and tshd_i/o_r of the master IC chip 340 may be coupled to tshd_i/o_l of the right slave IC chip 350. Hcal_pulse_i/o_l of the master IC chip 340 may be coupled to Hcal_pulse_i/o_r of the left slave IC chip 360, and Hcal_pulse_i/o_r of the master IC chip 340 may be coupled to Hcal_pulse_i/o_l of the right slave IC chip 350.

In other embodiments, each of the IC chips may include other input/output pins. For example, each of the IC chips may include input/output pins that are used to drive the sensor electrodes 205 for capacitive sensing and drive the display electrodes for display updating.

In one or more embodiments, an IC chip (e.g., the master IC chip 340, the right slave IC chip 350, and the left slave IC chip 360) that is configured for both capacitive sensing and display updating may be referred to as a touch and display driver integration (TDDI) chip. For example, the IC chips may be configured to drive one or more sensor electrodes 205 for at least one of transcapacitive sensing and absolute capacitive sensing.

While the embodiment of FIG. 3 illustrates three IC chips, in other embodiments, other numbers of IC chips may be implemented within the input device 100. For example, in one embodiment, at least two IC chips may be utilized to drive the display panel and perform touch sensing. Each IC chip may include a separate and distinct IC from the other IC chips. Further, each of the IC chips may be configured to update a different portion of the display panel and operate a different portion of the sensor electrodes 205 (e.g., sensor electrodes 205a, 205b, and 205c) for capacitive sensing. In one or more embodiments, two or more IC chips may drive at least one common sensor electrode 205 for capacitive sensing. In one embodiment, each IC chip is coupled to and configured to update a different portion of the source electrodes or lines of the display panel. Further, an IC chip may be configured to drive a different portion of the Vcom electrodes for display updating. In embodiments where the Vcom electrodes are used for capacitive sensing and display updating, each IC chip is configured to operate a different portion of the Vcom electrodes for capacitive sensing and display updating.

In one embodiment, each of the master IC chip 340, the right save IC chip 350, and the left slave IC chip 360) is independently coupled to substrate 320 of the display panel. Further, the master IC chip is coupled to each slave IC chip by one or more traces disposed on the substrate 320. In one embodiment, the substrate 320 is a glass substrate and the IC chips are communicatively coupled via one or more traces disposed on the glass substrate.

In embodiments employing two or more IC chips, one IC chip may be configured as a "master" (e.g., the master IC chip 340) and the other IC chips (e.g., the slave IC chips 350 and/or 360) may be configured as "slaves." IC chips configured as a "master" may be configured to provide one or more synchronization signals to the IC chips configured as "slaves" to synchronize at least one of display updating and capacitive sensing functions between the IC chips. In embodiments employing three IC chips, the master IC chip may be disposed between the two slave IC chips. In other embodiments, the master IC chip may be positioned such that each of the slave IC chips is on the same side of the master IC chip.

The master IC chip 340 may be configured to receive display data from a host processor for updating the display panel. For example, the master IC chip 340 may process the display data, and communicate the processed display data to the slave IC chips 350 and 360. Further, the master IC chip 340 may be configured to communicate sensor data to a host processor. For example, the master IC chip 340 may be configured to receive sensor data from each of the slave IC chips 350 and 360, combine the sensor data from the slave IC chips with the sensor data from the master IC chip, and communicate the combined sensor data to the host processor. In one embodiment, each of the IC chips may configured to processes the sensor data received at each respective IC chip before it is sent to the host processor. In other embodiments, raw sensor data (e.g., sensor data that is substantially unprocessed) is communicated to the host processor. In other embodiments, the master IC chip 340 is configured to receive raw sensor data from each of the slave IC chips 350 and 360, process the sensor data and then communicate the processed sensor data to the host processor. Processing the sensor data may include at least one of baselining the sensor data, filtering the sensor data, and determining positional information of one or more input objects.

In one or more embodiments, the master IC chip 340 and the slave IC chips 350, 360 may be synchronized such that the digital circuits of each IC chip operate within at least about 50 ns with each other IC chip. In other embodiments, the IC chips may be synchronized with each other such that the timing of the digital circuitry of each IC chip differs by more than 50 ns but doesn't introduce errors within the sensor data or display update. In one embodiment, the IC chips may be synchronized with each other such that the timing of the digital circuitry of each IC chip doesn't introduce display artifacts when updating the display panel and/or introduce errors into the sensor data acquired from the sensor electrodes. Further, synchronizing the IC chips synchronizes the timing of the sensing signals driven by each of the IC chips onto respective sensor electrodes 205.

In one embodiment, any timing mismatch between the sensing signals (e.g., sensing signals 342, 352, and 362) across the master IC chip 340 and the slave IC chips 350 and 360 may result in imperfectly guarded display panel capacitance, resulting in large amounts of charge to flow into the AFEs of the receiver circuitry of each IC chip. In such embodiments, one or more display electrodes of the display panel or sensor electrodes are at a different voltage than a sensor electrode operated for capacitive sensing. A capacitive coupling is formed between the voltage mismatched electrodes, which may be referred to as a background capacitance.

As the background capacitance is present in the sensor data acquired from the sensor electrodes, the dynamic range of the receiver circuitry available to handle potential interference and changes in capacitance of the sensor electrodes is diminished. In one embodiment, the value of the background capacitance may be greater than the value of the capacitive coupling between the sensor electrodes 205 and/or between a sensor electrode 205 and an input object. Thus it is difficult to detect and/or measure the capacitive coupling between the sensor electrodes and/or between a sensor electrode and an input object. Further, the background capacitance may cause the AFE of the receiver circuitry to saturate or clip, making it impossible to detect and/or measure the capacitive coupling between the sensor electrodes and/or between a sensor electrode and an input object.

In one or more embodiments, the master IC chip 340 is configured to perform one or more of frame synchronization, sensing burst synchronization, sensing cycle synchronization, and high speed oscillator clock synchronization with each of the slave IC chips 350, 360.

Each IC chip 340, 350, 360 may be configured to operate a different portion of the sensor electrodes 205 for capacitive sensing at a capacitive frame rate at one of 60 Hz or 120 Hz. In other embodiments, other capacitive frame rates may be utilized. In one embodiment, each IC chip 340, 350, 360 is coupled to each non-overlapping portion of the sensor electrodes 205 such that a sensor electrode is only coupled to one of IC chips 340, 350, and 360. For example, the slave IC chip 360 is communicatively coupled to sensor electrodes 205a, the master slave IC chip 340 is communicatively coupled to sensor electrodes 205b, and the slave IC chip 350 is communicatively coupled to sensor electrodes 205c. The IC chips may be coupled to the same number of sensor electrodes, or, in one or more embodiments, at least IC chip is coupled to a different number (e.g., more or less) of sensor electrodes than another IC chip. The IC chips may be coupled to respective sensor electrodes via one or more routings disposed on the substrate 320. In other embodiments, there may be some overlapping portions of the sensor electrodes 205 coupled to one or more of the IC chips 340, 350, 360.

Each IC chip may be configured to operate each respective sensor electrode once (or twice) per each capacitive frame. In one embodiment, operating the sensor electrodes for capacitive sensing includes driving the respective sensor electrodes with a respective one of sensing signals 342, 352, 362. The capacitive frame rate corresponds to a period of time during which sensor data is received from sensor electrodes coupled with each respective IC chip. In one embodiment, the rate at which the capacitive images are acquired is the capacitive frame rate (or sensing rate). For example, a capacitive image may be acquired once every 16 ms, generating a capacitive frame rate of 60 Hz. In other embodiments, the capacitive frame rate may be about 120 Hz, 240 Hz, or greater. Further, in one or more embodiments, the capacitive frame rate may be less than 60 Hz.

The master IC chip 340 may be configured to perform frame synchronization with each of the slave IC chips 350, 360 such that each IC chip begins a new capacitive frame at substantially the same time. In one embodiment, frame synchronization may occur at the startup of the IC chips, after a reset of one or more IC chips, and/or after a number of capacitive frames has occurred.

The Tcon 209 of each IC chip 340, 350, 360 may generate timing control signals that may be employed by the IC chip to perform display updating and capacitive sensing. In one embodiment, the timing signal which is used to indicate the start one or more of a capacitive sensing frame and a display frame is a timing signal for the vertical direction (i.e., vertical timing signal) or tsvd signal. Further, a timing signal configured to indicate the start of a display line of the display frame is a timing signal for the horizontal direction (i.e., horizontal timing signal) or tshd signal. Both of the tsvd and tshd signals may be generated by the Tcon 209 of the master IC chip 340 and communicated to each of the slave IC chips 350, 360.

Figures 1, 7A:
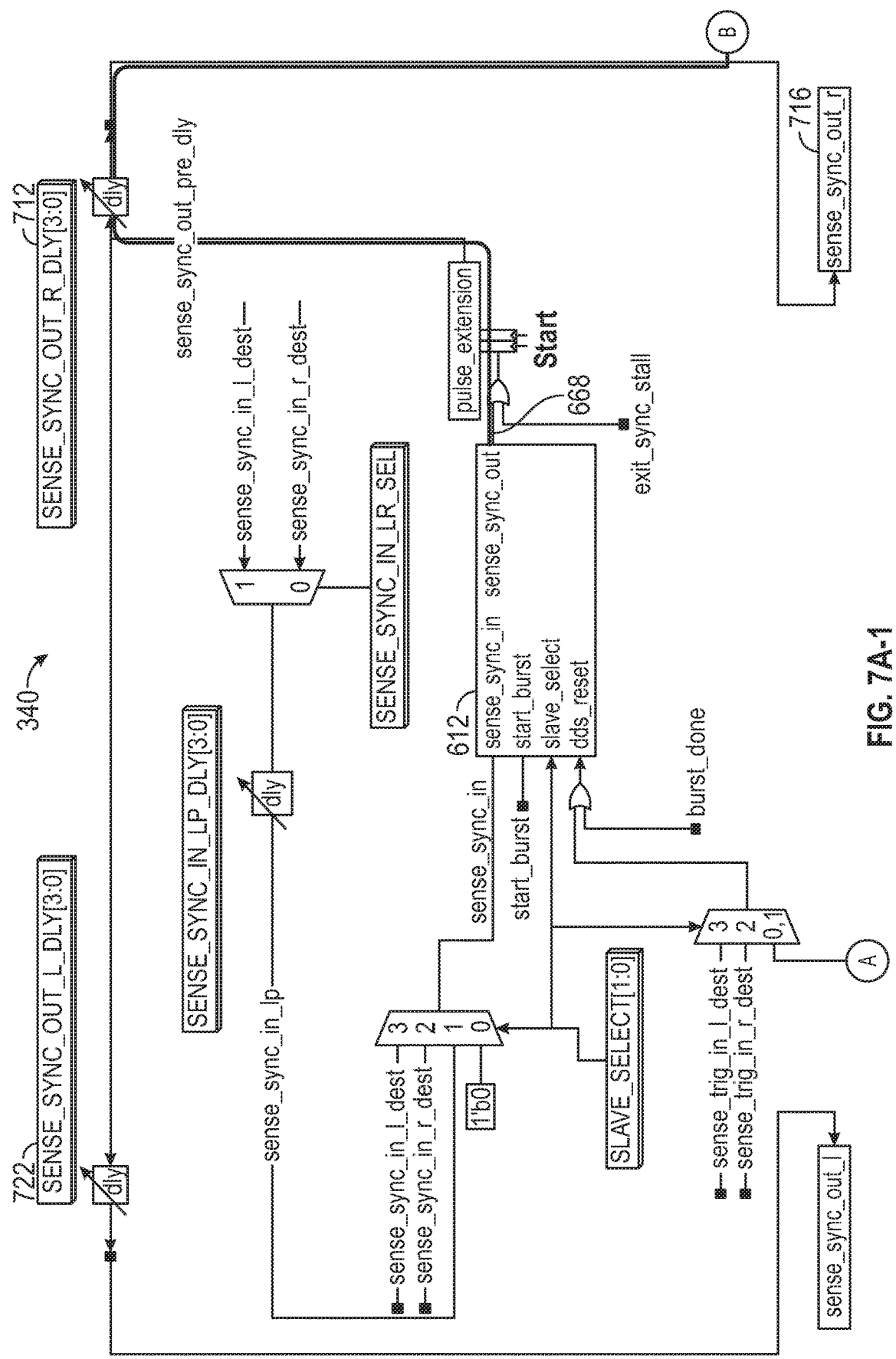
Figures 2, 7A:
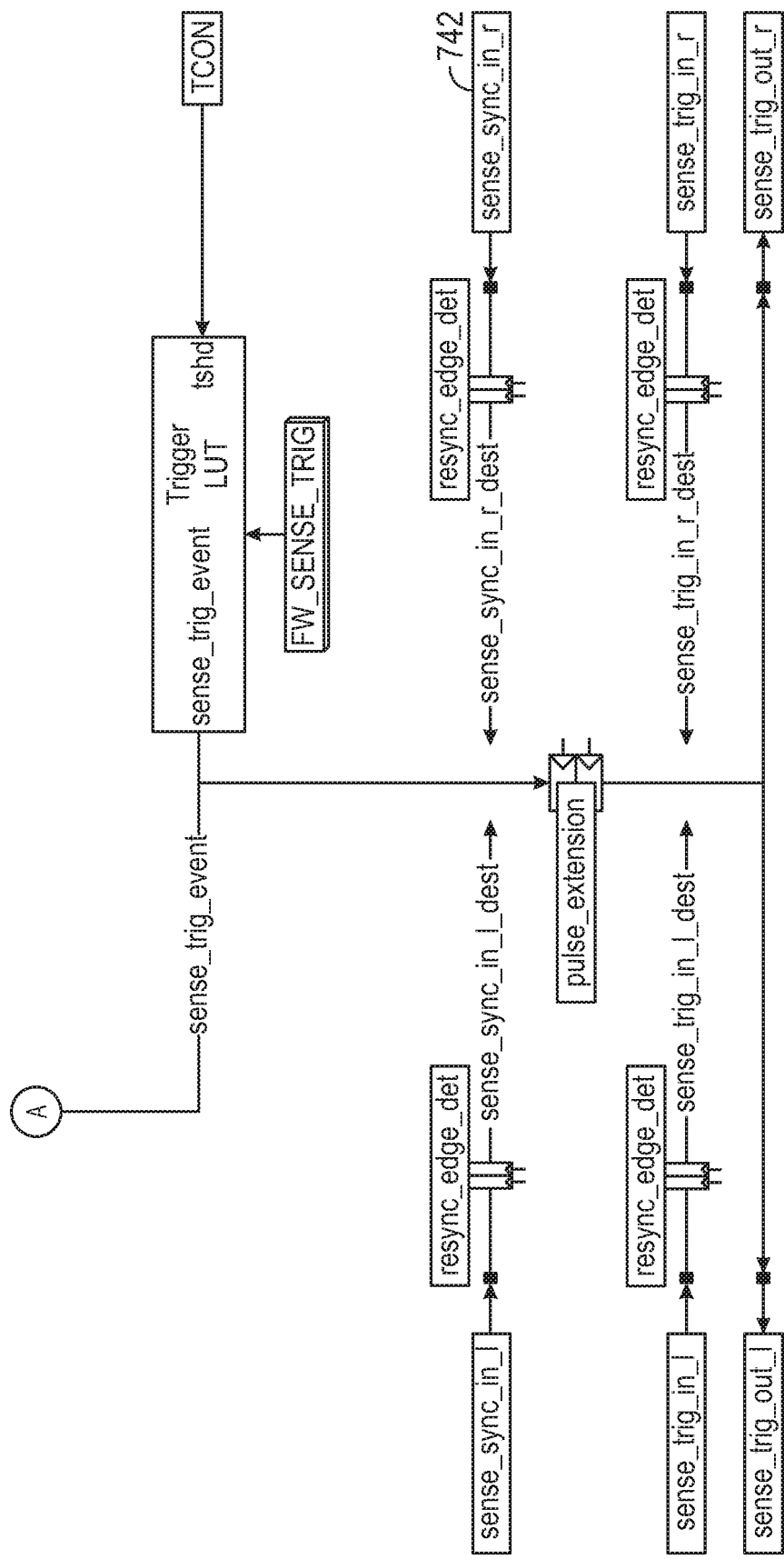
Figures 3, 7A:
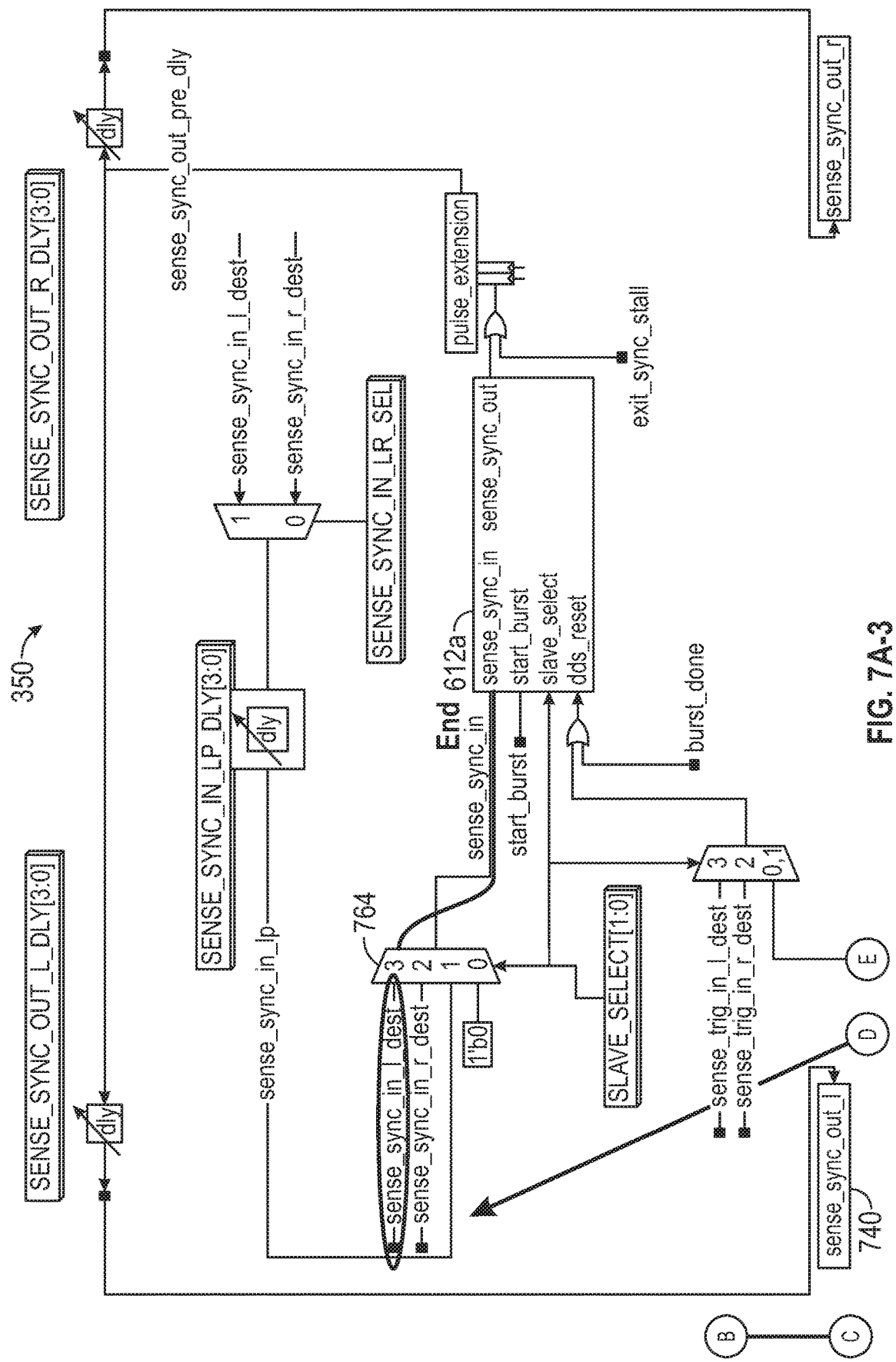
Figures 4, 7A:
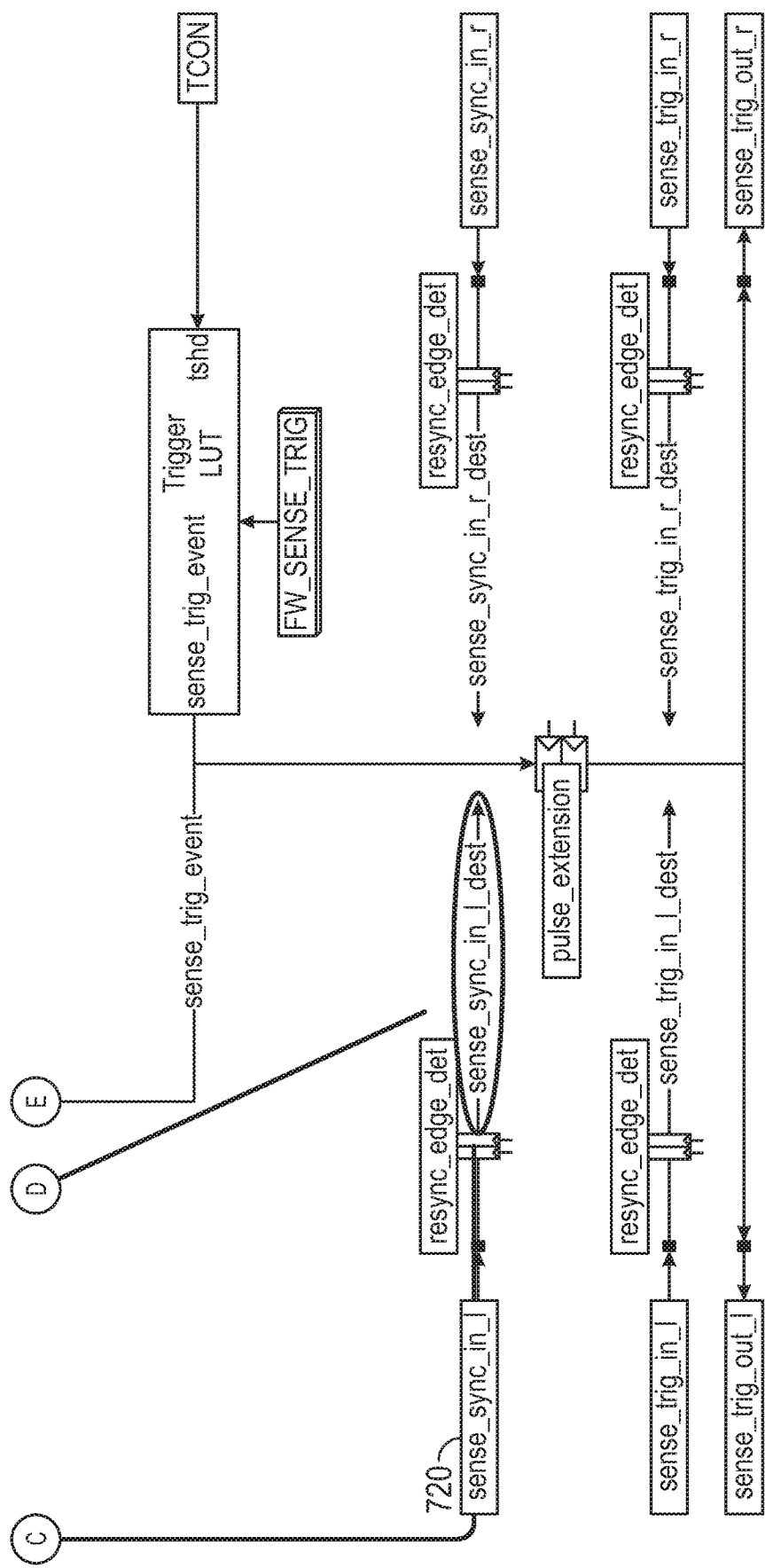

FIG. 4 illustrates an example embodiment of trigger look up table (LUT) logic 410. In one embodiment, each of the IC chips 340, 350, 360 includes a trigger LUT logic 410. The tsvd signal generated by the Tcon 209 of the master IC chip 340 may be routed to the trigger LUT logic of each of the master IC chip 340 and the slave IC chip 350, 360. In one embodiment, the tsvd signal may be communicated from tsvd_i/o_l and tsvd_i/o_r of the master IC chip 340 to tsvd_i/o_r of the left slave IC chip 360 and tsvd_i/o_l of the right slave IC chip 350. Further, Tcon 209 of the master IC chip 340 may be configured to communicate a tshd signal to each of the slave IC chips 350, 360. For example, the tshd signal may be communicated from tshd_i/o_l and tshd_i/o_r of the master IC chip 340 to pin tshd_i/o_r of the right slave IC chip 360 and tshd_i/o_l the left slave IC chip 350.

Tcon 209 of the master IC chip 340 communicates both the tsvd and tshd signals to the trigger LUT logic 410 of the master IC chip 340, as well as to the trigger LUT logic 410 of each of the slave IC chips 350, 360. The trigger LUT logic 410 of each slave IC chip 350, 360 is configured to generate a local sense_trig_event pulse 420 from the tsvd and tshd signals provided by the master IC chip 340. Further, each IC chip 340, 350, and 360 may initiate a burst sensing state machine that enables the acquisition of sensor data in response to the respective local sense_trig_event pulse 420. The burst sensing state machine of each IC chip initiates the steps utilized to acquire sensor data corresponding to the bursts of the sensing signal.

The INT_TCON_TRIG registers 432, 434 allows an IC chip to use a TCON of the IC chip to generate respective tshd and tsvd signals. The SLAVE_SELECT registers 436, 438 specify whether a chip is in a single IC configuration, configured as a master IC chip, configured as a left slave IC chip, or configured as a right slave IC chip. Further, the sense_trig_event signal 420 may be utilized by each respective IC chip to initiate a sensing burst. Each sensing burst corresponds to at least one positive and negative voltage transition. Each sensing signal includes a plurality of bursts. In one embodiment, the SLAVE_SELECT registers 436, 438 and the INT_TCON_TRIG registers 432, 434 are communicatively coupled with multiplexers 462 and 464 and may control the single coupled by the multiplexers 462 and 464 into the trigger LUT 410. For example, the SLAVE_SELECT registers 436 and the INT_TCON_TRIG registers 432 are utilized to select one of the tshd_in_l_dest, tshd_in_r_dest, Tshd_Tcon signals coupled by multiplexer 462 into trigger LUT 410. Further, the SLAVE_SELECT registers 438 and the INT_TCON_TRIG registers 434 are utilized to select one of the tsvd_in_l_dest, tsvd_in_r_dest, Tsvd_Tcon signals coupled by multiplexer 464 into trigger LUT 410.

At the start of a new capacitive frame, the FW_SENSE_TRIG register 450 is programmed to generate a sense_trig_event signal 420 when the tsvd signal is received. Further, as the tsvd signal is generated at substantially the same time for all the IC chips, the beginning of a new capacitive frame will start at the same time for all the IC chips.

Figure 5A:
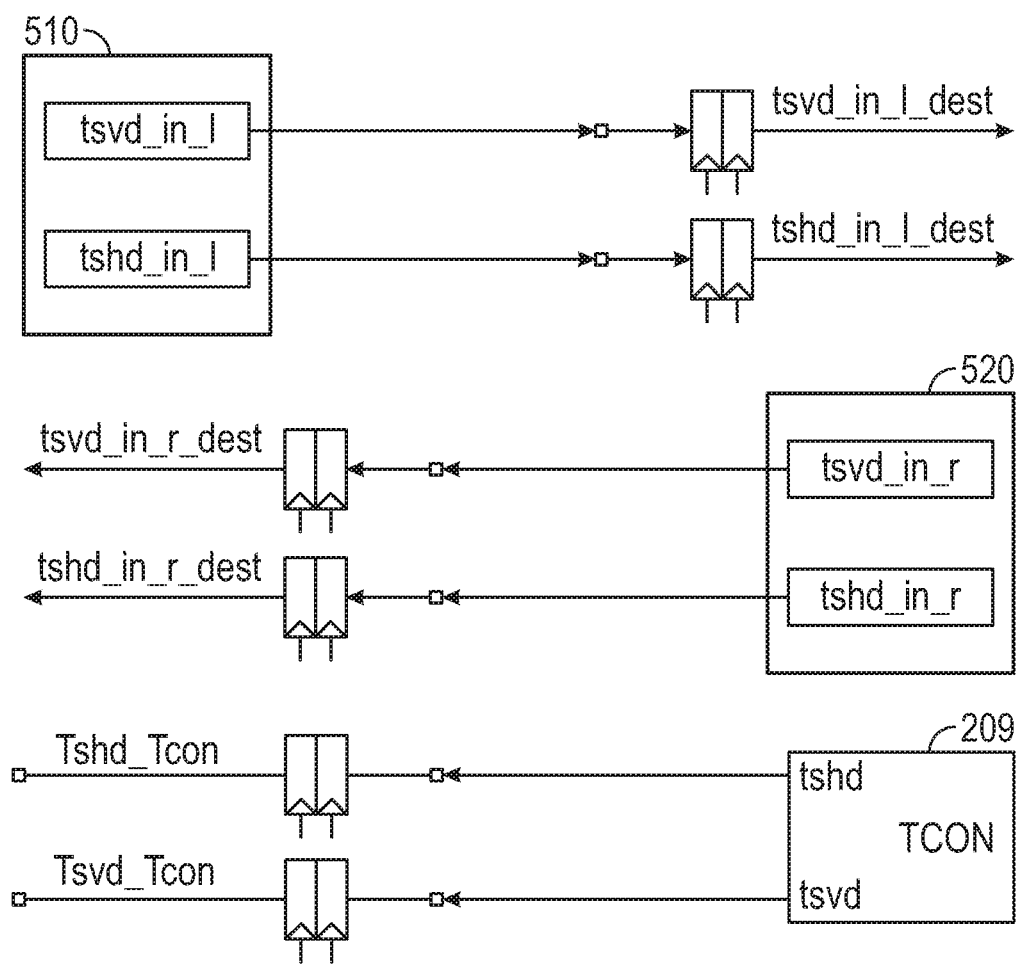
FIG. 5A illustrates various signal connections, according to one or more embodiments.

FIG. 5A illustrates diagrams that show the origination of the signals used in the figure above. Element 510 identifies input/output pins tsvd_in_l and tshd_in_l on the left side of the slave IC chip 360. These pins may receive the tsvd and tshd signals from the master IC chip 340. The tsvd_in_l pin and the tsh_in_l pin may be communicatively coupled to tsvd_in_l_dest and tshd_in_l_dest inputs of multiplexers of the slave IC chip 360. Similarly, element 520 identifies input/output pins tsvd_in_r and tshd_in_r on the right side of the slave IC chip 350. These may receive the tsvd and tshd signals from the master IC chip 340. The tsvd_in_l and the tsh_in_l may be communicatively coupled to tsvd_in_r_dest and tshd_in_r_dest of the multiplexers of the slave IC chip 360. Further, Tcon 209 of the master IC chip 340 is configured to output signals tshd and tsvd to pins tshd_Tcon and tsvd_Tcon of the multiplexers coupled to the trigger LUT 410 of the master IC chip 340.

In one or more embodiments, the master IC chip 340 may be configured to perform burst synchronization with the slave IC chips 350 and 360. Burst synchronization may occur once a burst, after a plurality of bursts, and/or once one or more capacitive frames. Each capacitive frame may include multiple bursts. In one embodiment, the Tcon (e.g., Tcon 209) of the master IC chip 340 sends the tshd signal of the master IC chip to the trigger LUT logic (e.g., trigger LUT logic 410) of the master IC chip 340. Further, after a first sensing burst of a capacitive frame, each IC chip employs a FW_SENSE_TRIG signal that is programmed to generate a sense_trig_event signal based on a respective tshd signal. As the tshd signal arrives at substantially the same time for all three IC chips, each IC chip generates a sense_trig_event signal at roughly the same time, which maintains burst synchronization.

Figure 5B:
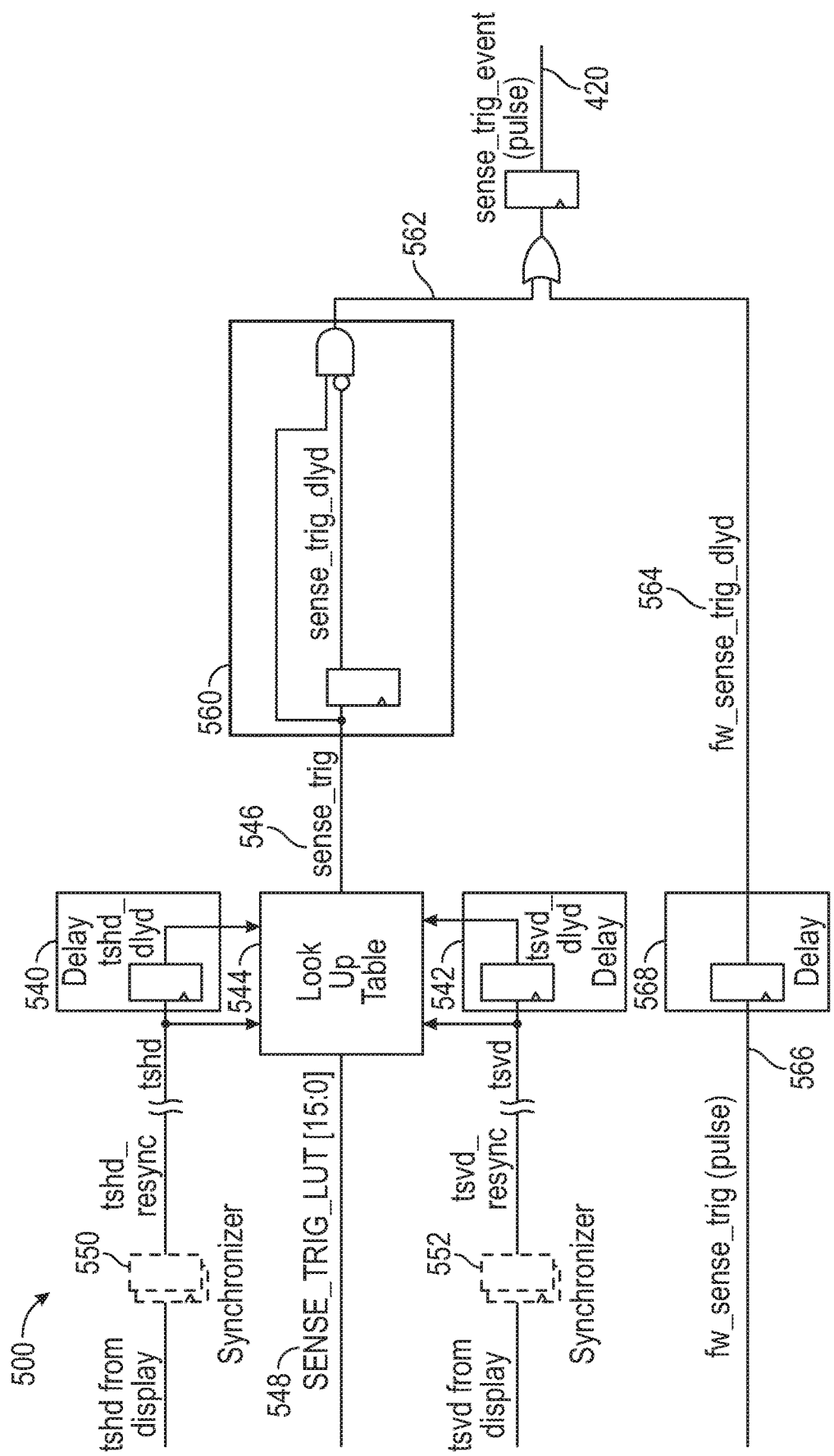
FIG. 5B a system for generating a synchronization signal, according to one or more embodiments.

FIG. 5B is a block diagram of system 500 configured to generate a sense_trig_event signal 420 according to one or more embodiments. As described with regard to FIG. 4, in the embodiment of FIG. 5B, the sense_trig_event signal 420 may be initiated by the fw_sense_trig signal 566. In one embodiment, synchronizers 550 and 552 may be utilized to synchronize the tshd and tsvd signals with the corresponding signals of the master IC chip 340. As is illustrated in FIG. 5B, the tshd signal is input into delay unit 540, and the tsvd signal is input into delay unit 542. In one or more embodiments, both the tshd signal and the delayed tshd signal, and both the tsvd and the delayed tsvd signals are provided to LUT 544. Register sense_trig_LUT 548 may be utilized to control generation of the sense_trig signal 546 by LUT 544. Sense_trig signal 546 is utilized by pulse generator 560 to generate an output pulse 562. The pulse generator 560 outputs the pulse 562 for each detected rising edge of the sense_trig 546 signal. The output 562 of the pulse generator 560 may be combined with a delayed fw_sense_trig_dlyd signal 564 to generate the sense_trig_event pulse 420. The fw_sense_trig signal 566 is delayed by delay unit 568 to generate the fw_sense_trig_dlyd signal 564. In one embodiment, delay units 540, 542 and 568 are programmable delays that ensure that each IC chip 340, 350, 360 generates the sense_trig_even pulse 420 at substantially the same time. The programmable delays may be different for each of the IC chips. Further, in one or more embodiments, the programmable delays may be determined as described in the following.

The sensing signals (e.g., Vguard signal) of the IC chips (e.g., the master IC chip 340, the slave IC chips 350, 360) may be generated using a waveform generator (e.g., a Direct Digital Synthesize (DDS) device or similar device). The sensing signal waveform may be periodic voltage waveform that is generated by the waveform generator. In one embodiment, the waveform generator generates the sensing signal one half period at a time. In one embodiment, the waveform generator is reset at the beginning of each sensing burst. Further, in one or more embodiments, the burst sensing state machine for each IC chip is also reset and initiated at the beginning of each sensing burst. In one embodiment, the sensing signal may be driven onto one or more sensor electrodes to perform capacitive sensing and onto one or more display electrodes (e.g., gate electrodes, source electrodes, or the like) as a guard signal to guard the display electrodes.

The master IC chip 340 may be configured to perform sense cycle synchronization with the slave IC chips 350, 360. In one embodiment, synchronizing the sense cycle ensures that the waveform generator of each IC chip initiates every half period at substantially the same time. In one embodiment, the delay between the start of each half period is no greater than about 50 ns between the three chips. In other embodiments, the delay between the start of each half period is less than a period of time that may lead to display artifacts and errors within the sensor data.

Figure 6A:
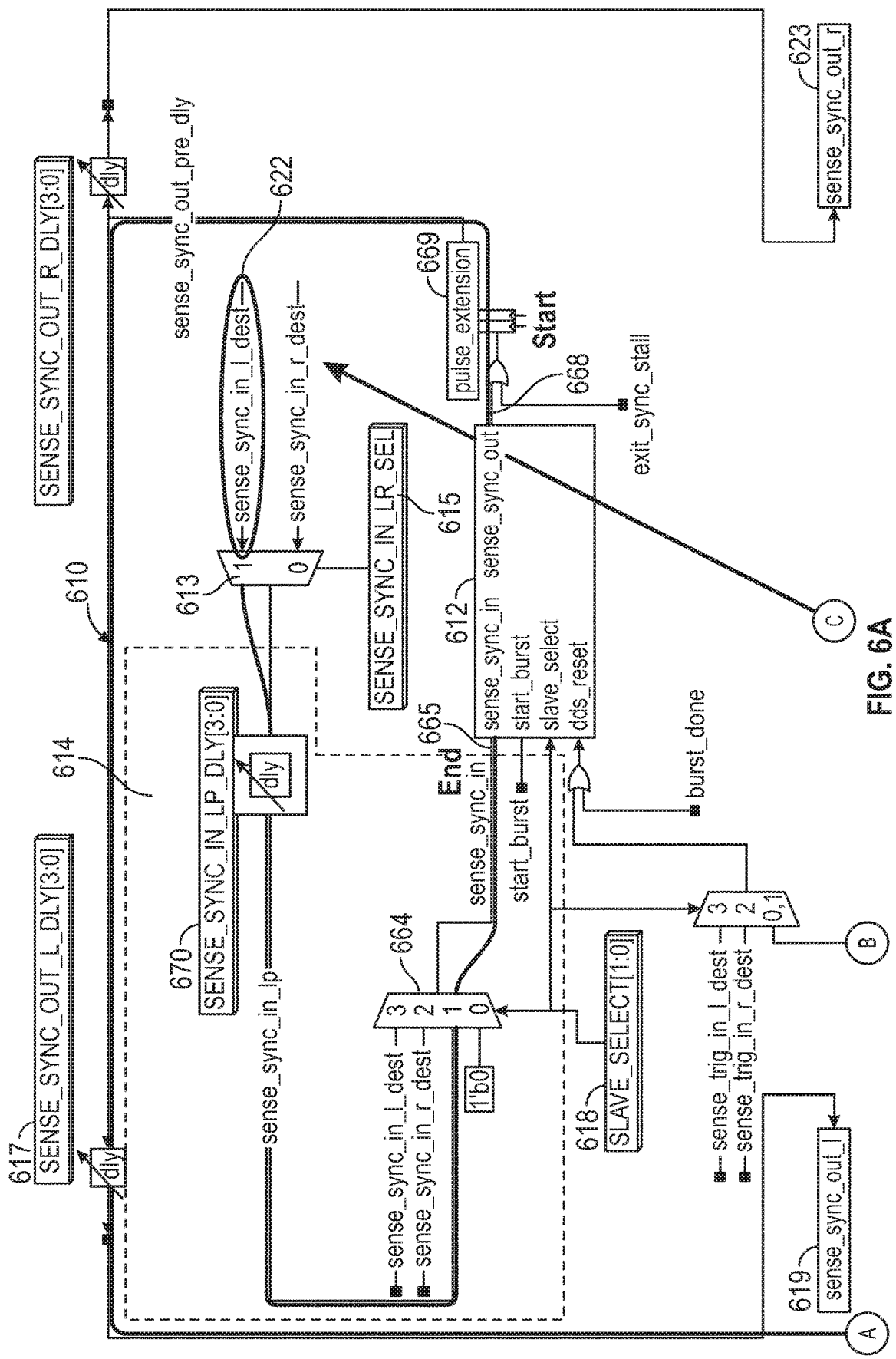
FIGS. 6A, 6B and 6C illustrate a block diagram for synchronizing chips, according to one or more embodiments.
Figure 6A:
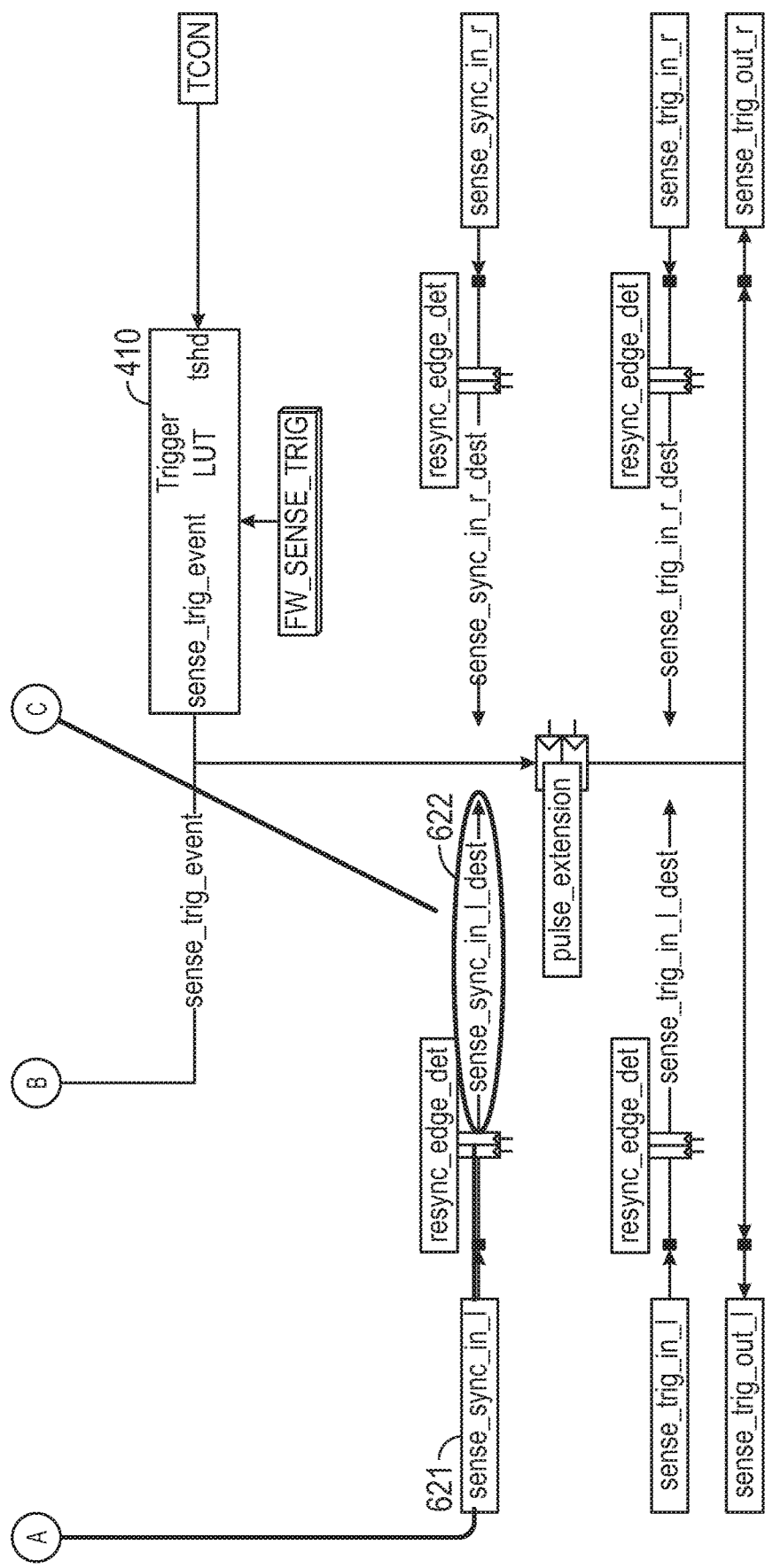
Figure 6B:
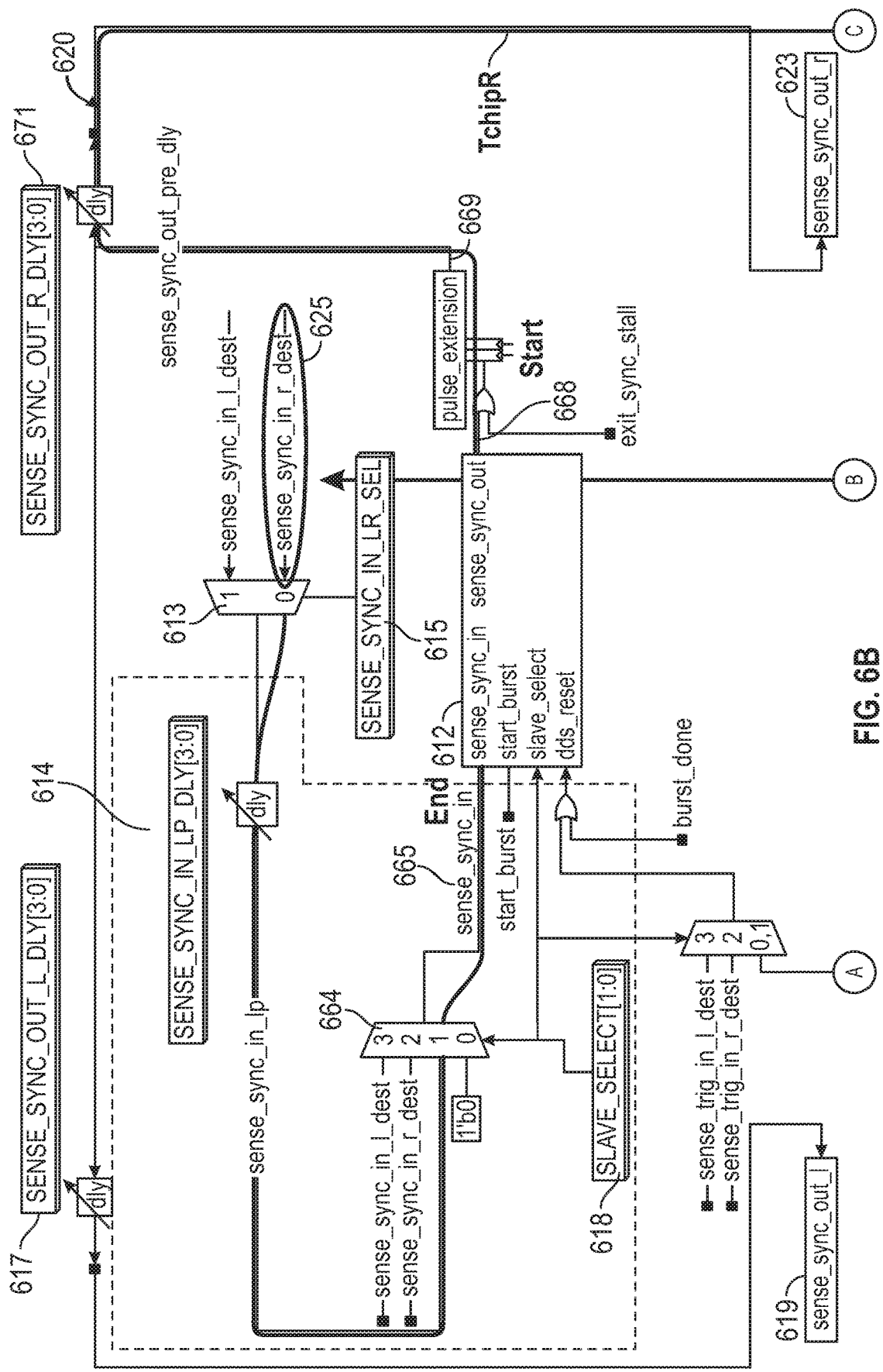
Figure 6B:
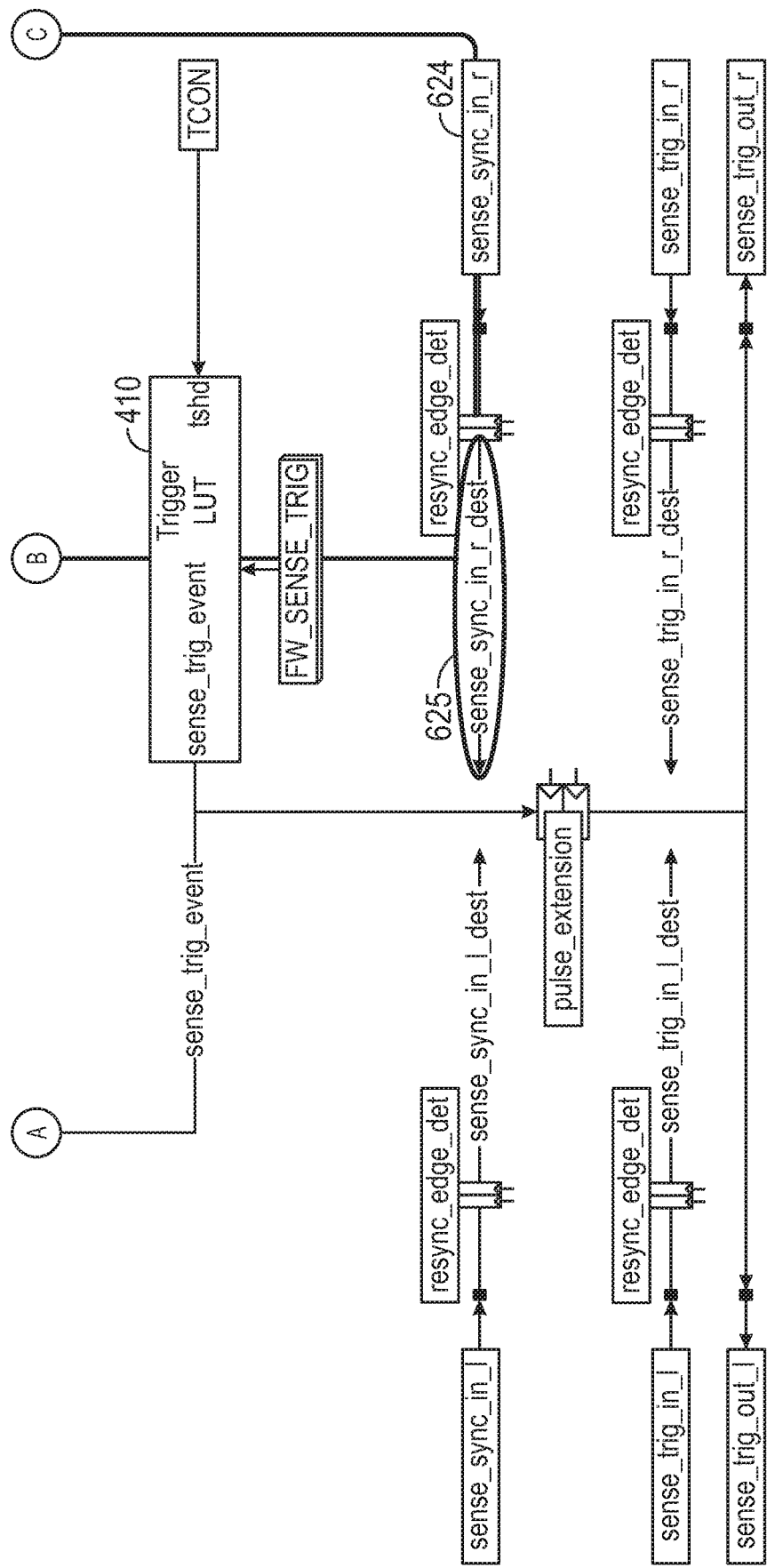

FIGS. 6A and 6B each illustrate an example sense synchronization signal loopback path of the master IC chip according to one or more embodiments. Each loopback path corresponds to a communicative coupling between a slave IC chip and a master IC chip. FIG. 6A illustrates the example path 610 of the master IC chip for a left slave IC chip, and FIG. 6B illustrates the example path 620 of the master IC chip for a right slave IC chip. Further, in the embodiments illustrated in FIGS. 6A and 6B, the master IC chip sends the sense_sync_out signal out of the waveform generator 612 of the master IC chip. The label Start indicates where the path starts with the sense_sync_out signal 668 provided by the waveform generator 612. The sense_sync_out signal 668 then flows along the indicated path 610 where it is routed out of the master IC chip.

In the embodiment of FIG. 6A, the sense_sync_out signal 668 flows through a pulse_extension block 669, through a delay block (or sense_sync_out_l_DLY block) 617, and out through a sense_sync_out_l pin 619 of the master IC chip 340 and then back into the master IC chip 340 via a sense_sync_in_l pin 621. The sense_sync_out_l_DLY block 617 may be a programmable delay. Further, the signal through the sense_sync_in_l pin 621, that is the sense_sync_in_l_dest signal 622, flows through multiplexer 613, and then into the waveform generator 612 at the label End via circuitry 614. The circuitry 614 generates a sense_sync_in signal 665 from the sense_sync_in_l_dest signal 622. The circuitry 614 may include a delay block (or SENSE_SYNC_IN_LP_DLY block) 670 and multiplexer 664.

In the embodiment of FIG. 6B, the sense_sync_out signal 668 flows along path 620 through a pulse_extension block 669, through a delay block (or sense_sync_out_r_DLY block) 671, and out through a sense_sync_out_r pin 623 of the master IC chip and then back into the master IC chip via a sense_sync_in_r pin 624. The sense_sync_out_r_DLY block 671 may be a programmable delay. Further, the signal through the sense_sync_in_r pin 624, that is the sense_sync_in_r_dest signal 625, flows through multiplexer 613, and then into the waveform generator 612 at the label End via circuitry 614.

In one or more embodiments, the master IC chip is configured to simultaneously transmit sense_sync_out signals for slave IC chips (e.g., right and left slave IC chips) that are coupled to the master IC chip, and a loopback path may be present for each of the slave IC chips.

Figure 6C:
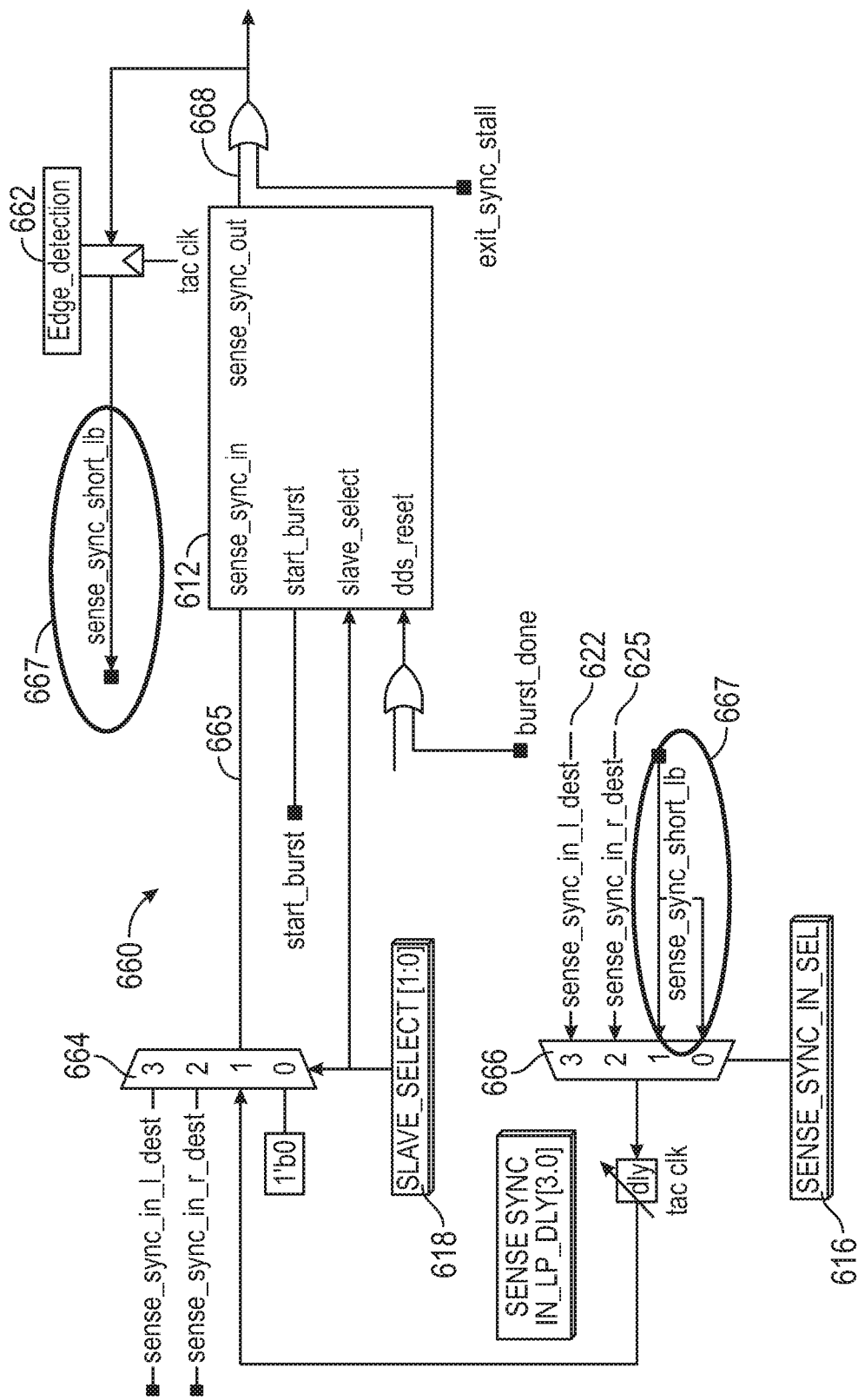

FIG. 6C illustrates an example loopback path circuitry 660 for the master IC chip according to one or more embodiments. This may be used in conjunction with the embodiments of FIG. 6A and FIG. 6B. As is illustrated, a sense_sync_short_lb signal 667 may be generated from the sense_sync_out signal 668. The sense_sync_short_lb signal 667 may be utilized as a trigger by the master IC chip 340 to generate the sense_sync_out signal 668 and synchronize the master IC chip 340 with the slave IC chip 350, 360. For example, in one embodiment, as the sense_sync_short_lb signal 667 flows into the multiplexer 666 without being transmitted over input/output pins 619, 621, 623, and 624, the sense_sync_short_lb signal 667 may mitigate or avoid timing jitters as the timing generated by the sense_sync_short_lb signal is not affected by external interferences. This improves the synchronization between the master IC chip 340, and the slave IC chips 350, 360.

Referring back to FIGS. 6A, 6B, and 6C, in one or more embodiments, the master IC chip is configured to control which side of the master IC chip 340, for example left or right, the signal is routed back to, via a selector such as SENSE_SYNC_IN_LR_SEL register 615 (FIGS. 6A and 6B) and SENSE_SYNC_IN_SEL register 616 (FIG. 6C) coupled to the multiplexer 613 (FIGS. 6a and 6b), 666 (FIG. 6c). Further, the signal may be delayed by the SENSE_SYNC_IN_LP_DLY block 670. The SENSE_SYNC_IN_LP_DLY block 670 may be a programmable delay. The signal then travels through the multiplexer 664 and is received by a sense_sync_in input port of the master IC chip. The multiplexer 664 may be controlled via SLAVE_SELECT register 618. In one embodiment, when the master IC chip 340 receives the sense_sync_out signal, a new half period of the sensing signal (e.g., sensing signal 342) is initiated.

Figures 1, 7B:
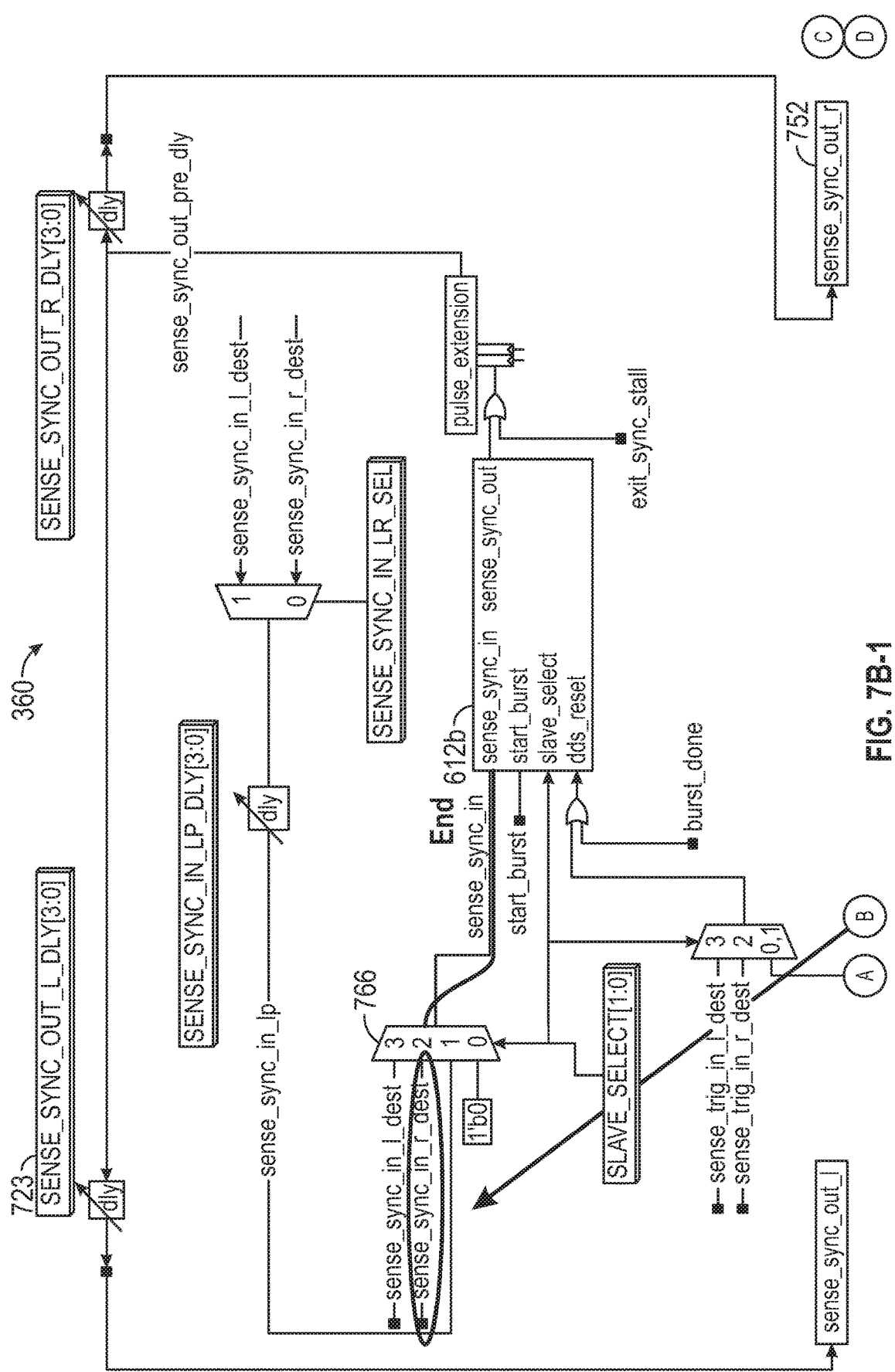
Figures 2, 7B:
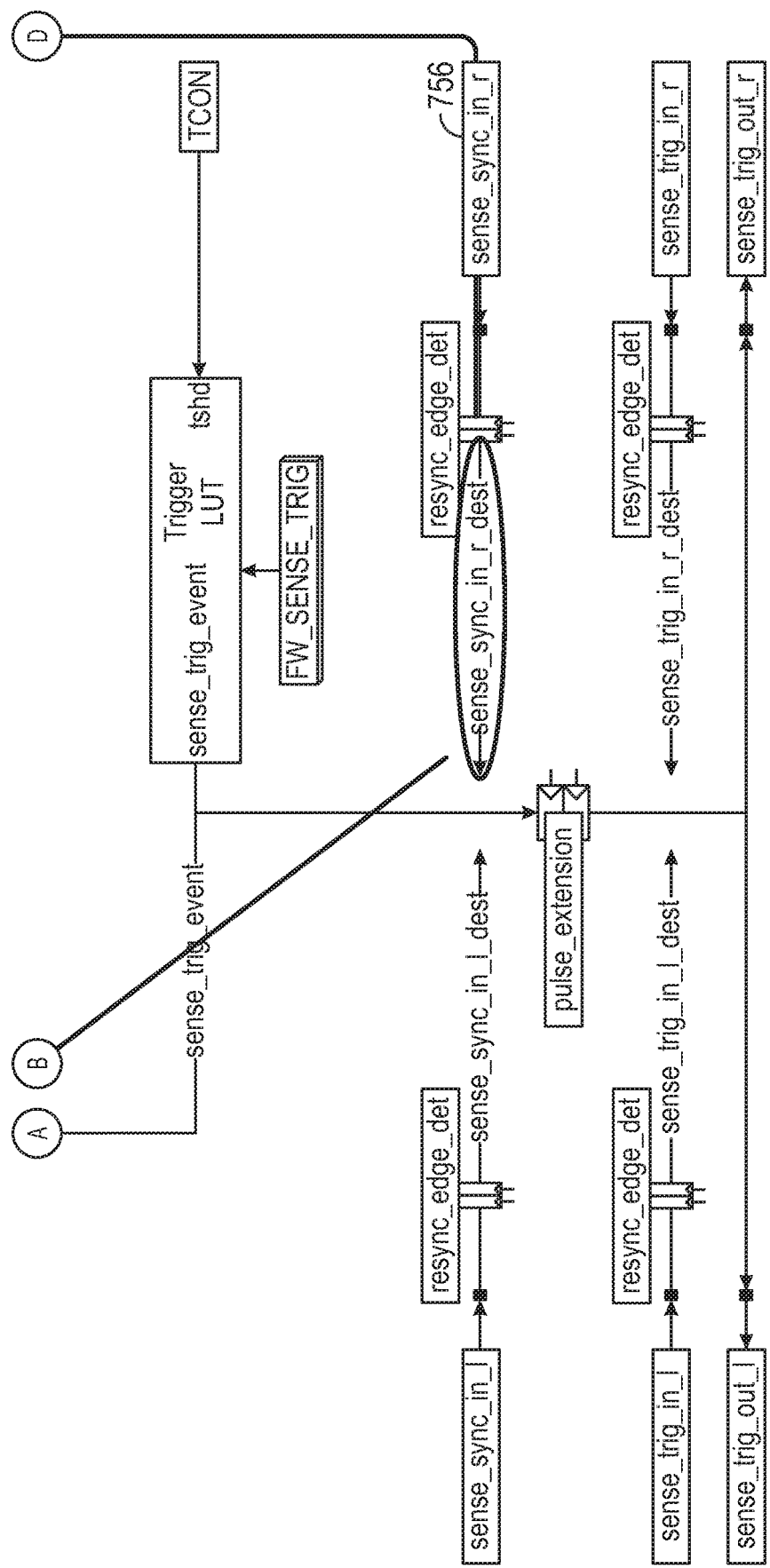
Figures 3, 7B:
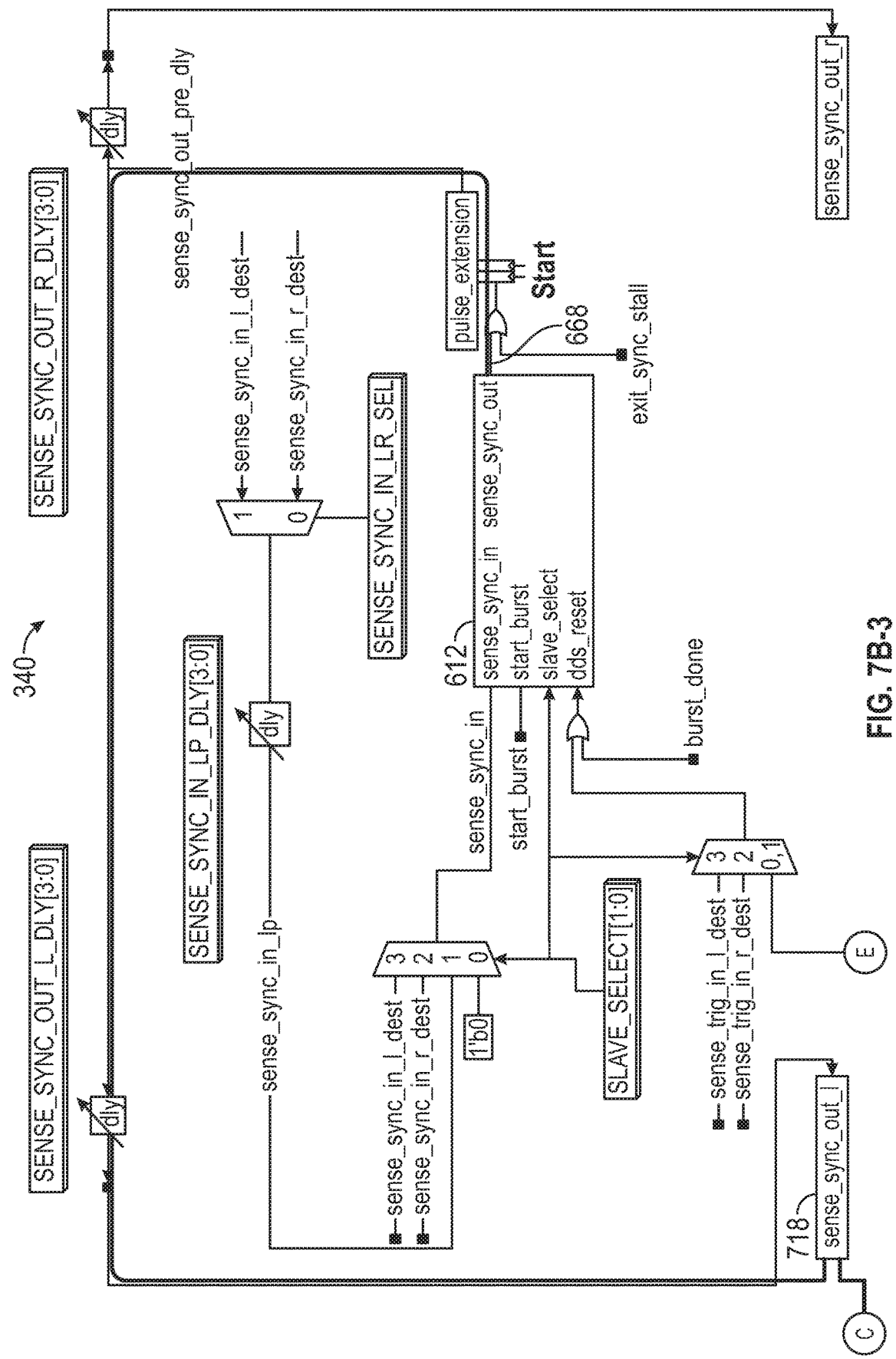
Figures 4, 7B:
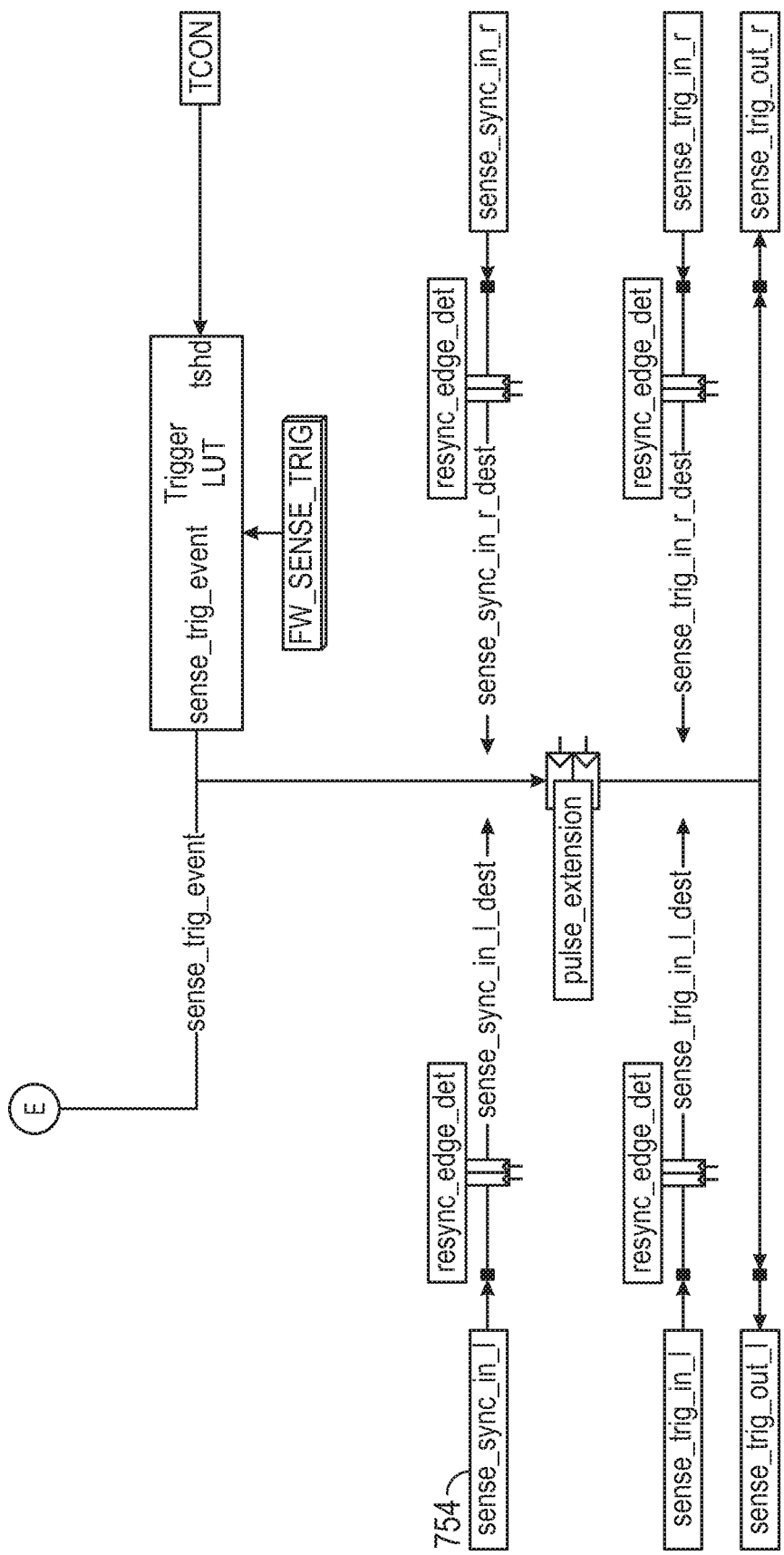

FIGS. 7A and 7B illustrate embodiments where the master IC chip communicates the sense_sync_out signal 668 to slave IC chips for sense cycle synchronization. For example, in the embodiment of FIG. 7A, the master IC chip 340 is communicatively coupled with the slave IC chip 350 located to the right of the master IC chip 340. Further, in the embodiment of FIG. 7B, the master IC chip 340 is communicatively coupled with the slave IC chip 360 located to the left of the master IC chip 340. In one embodiment, the master IC chip 340 communicates the sense_sync_out signal 668 out of the same side of the master IC 340 chip along where the slave IC chip is positioned. For example, the slave IC chip 350 is positioned along the right side of the master IC chip 340, and the sense_sync_out signal 668 is output from a pin along the right side of the master IC chip 340. In other embodiments, the sense_sync_out signal 668 may be output from a pin from a side of the master IC chip 340 that is different than the side of the master IC chip 340 that the slave IC chip is positioned.

In one embodiment, the sense_sync_out signal 668 is delayed by a programmable delay before it is transmitted from the master IC chip 340 to the slave IC chip 350, 360. The sense_sync_out signal 668 may then be transmitted out of a pin of the master IC chip 340 to a sense_sync_i/o pin of the slave IC chip 350, 360. In one embodiment, a trace along which the sense_sync_out signal 668 travels is disposed on a glass substrate of a display panel. The display panel may be part of an input device (e.g., input device 100). In one embodiment, after the sense_sync_out signal 668 is received via the sense_sync_i/o pin of the slave IC chip, the sense_sync_out signal 668 is routed via a multiplexer to a waveform generator of the corresponding slave IC chip.

In one or more embodiments, when performing sense cycle synchronization with the slave IC chips 350, 360, the master IC chip 340 is configured to utilize the programmable delays, e.g., sense_sync_out_r_dly 712 and sense_sync_out_l_dly 722, to synchronize the sense cycle of the master IC chip 340 with the sense cycles of the slave IC chips 350, 360. By tuning each of the programmable delays within the master IC chip 340, the sense cycle synchronization between the master IC chip 340 and each slave IC chip 350, 360 may occur. In one embodiment, the amount of the programmable delays may be determined by performing one or more of the delay calibration techniques describe herein. For example, the programmable delays may be calibrated such that the sense_sync_out signal 668 generated by the master IC chip 340 arrives at the waveform generators 612, 612a, 612b of the IC chips 340, 350, 360 within about 50 ns of each other. In other embodiments, the programmable delays may be calibrated such that the sense_sync_out signal 668 is received by the waveform generators 612, 612a, 612b of the IC chips 340, 350, 360 within a period of time relative to each other that at least minimizes errors and/or differences in the sensor data acquired by each of the IC chips.

In other embodiments, to perform delay calibration, the master IC chip transmits a timing pulse along a loopback path within the master IC chip and along a round trip path to and back from the slave IC chip. The master IC chip may time the signal propagation of the timing pulse along these paths. For example, the master IC chip times the signal propagation of the timing pulse that was transmitted via the loopback path of the master IC chip and the signal propagation of the timing pulse that was transmitted via the path from the master IC chip to the slave IC chip and then back to the master IC chip. The timing pulse may be the sense_sync_out signal 668.

Figure 8A:
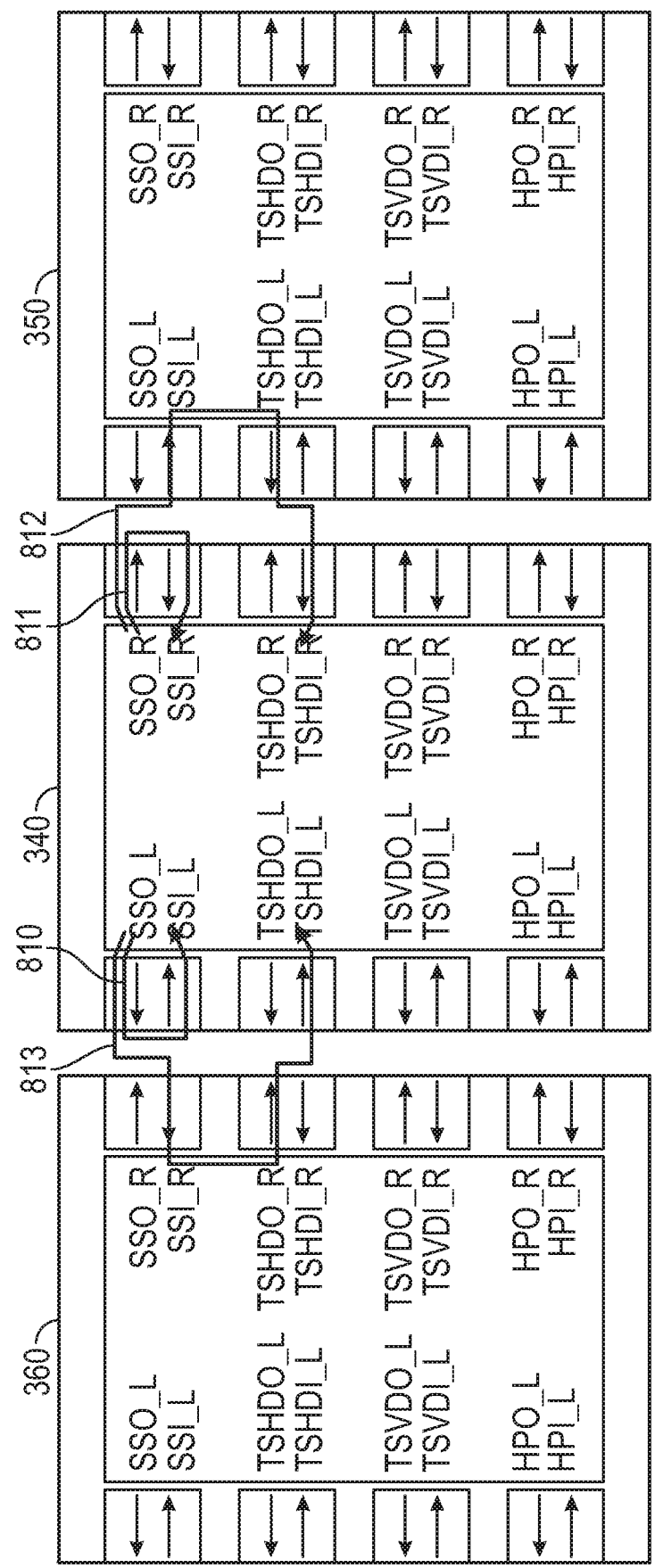
FIGS. 8A and 8B illustrate a block diagram of signal pathways, according to one or more embodiments.

FIG. 8A is a diagram of the signal paths for performing delay calibration in an embodiment having two slave IC chips 350, 360 and one master IC chip 340, according to one or more embodiments. In an embodiment, having a single slave IC chip and a master IC chip, one or more of the signals paths may be omitted. For example, in an embodiment where the right slave IC chip is omitted, the corresponding signal paths are also omitted. Further, in an embodiment where the left slave IC chip is omitted, the corresponding signal paths are also omitted.

In one embodiment, the master IC chip 340 initiates a delay calibration clock and sends the sense_sync_out signal to the slave IC chips 350, 360 via signal paths 812 and 813 and also locally onto both sides of the master IC chip 340 that are coupled to the slave IC chips 350, 360 via signal paths 810 and 811. The sense_sync_out signal propagates along each of paths 810-813 illustrated in FIG. 8A. For example, the sense_sync_out signal may be communicated from the master IC chip 340 to each of the slave IC chips 350, 360 and then back onto the master IC chip 340. Further, the sense_sync_out signal may be transmitted locally on the master IC chip 340 via the loopback path.

With reference to the loopback paths 810 and 811 of the master IC chip 340, the sense_sync_out signal may be sent out at least one of the right side (SSO_R) pad and the left side (SSO_L) pad. The sense_sync_out signal may be looped back, on the pad, to the waveform generator of the master IC chip 340 via the signal path 810, 811. In one embodiment, the master IC chip 340 may measure only one of the loopback paths at a time and determine the delay along which path, the left path or the right path, is measured. In the embodiment, for example, the value of the SENSE_SYNC_IN_LR_SEL register 615 of the master IC chip 340 may be utilized to make the determination. In other embodiments, each of the paths may be simultaneously measured.

In one embodiment, the sense_sync_out signal is communicated to the right slave IC chip 350 via the SSO_R pad of the master IC chip. The sense_sync_out signal travels across the substrate that each of the IC chips is mounted to, e.g., substrate 320, from the master IC chip 340 to the SSI_L pad of the right slave IC chip 350. The right slave IC chip 350 receives the sense_sync_out signal and routes the sense_sync_out signal back out through the TSHDO_L pad, over the substrate to the TSHDI_R pad of the master IC chip 340. The master IC chip 340 receives this sense_sync_out signal, stops the timer, and records the corresponding round trip propagation time.

In one embodiment, with reference to FIG. 7A, the timing signal, e.g. sense_sync_out signal 668, is transmitted from the waveform generator 612 of the master IC chip 340, out of sense_sync_out_r pin 716 of the master IC chip 340 to the sense_syc_in_l pin 720 of the slave IC chip 350 and then to the waveform generator 612a of the slave IC chip 350. A counter is started when the timing signal is transmitted by the waveform generator 612. The timing signal is then transmitted out of the waveform generator 612a through the sense_sync_out_l pin 740 of the slave IC chip 350 to the sense_sync_in_r pin 742 of the master IC chip 340 and then into the waveform generator 612. The waveform generator 612 stops the counter when the signal timing signal is received. The value of the counter corresponds to the amount of delay that between the master IC chip 340 and the slave IC chip 350.

In another embodiment, the sense_sync_out signal is communicated to the left slave IC chip 360 via the SSO_L pad of the master IC chip 340. The sense_sync_out signal travels across the substrate that each of the IC chips is mounted, e.g. substrate 320, from the master IC chip 340 to the SSI_L pad of the left slave IC chip 360. The left slave IC chip 360 receives the sense_sync_out signal and routes the sense_sync_out signal back out through the TSHDO_R pad, over the substrate to the TSHDI_L pad of the master IC chip 340. The master IC chip 340 receives this sense_sync_out, stops the timer, and records the corresponding round trip propagation time.

In one embodiment, with reference to FIG. 7B, the timing signal, e.g. sense_sync_out signal 668, is transmitted from the waveform generator 612 of the master IC chip 340, out of sense_sync_out_l pin 718 of the master IC chip 340 to the sense_syc_in_l pin 756 of the slave IC chip 360 and then to the waveform generator 612b of the slave IC chip 360. A counter is started when the timing signal is transmitted by the waveform generator 612. The timing signal is then transmitted out of the waveform generator 612b through the sense_sync_out_r pin 752 of the slave IC chip 360 to the sense_sync_in_l pin 754 of the master IC chip 340 and then into the waveform generator 612. The waveform generator 612 stops the counter when the signal timing signal is received. The value of the counter corresponds to the amount of delay that between the master IC chip 340 and the slave IC chip 360.

In one embodiment, the signal propagation measurement on master IC chip loopback path on the right side, e.g., path 811, may be referred to as M2M_R and on the left side, e.g., path 810 may be referred to as M2M_L. Further, the round trip signal propagation measurement from the master IC chip 340 to the slave IC chip 350, e.g., path 812, may be referred to as M_RS_M. The round trip signal propagation measurement from the master IC chip 340 to the slave IC chip 360, e.g., path 813 may be referred to as M_LS_M. Further, in one or more embodiments, paths 812 and 813 may be substantially symmetric with each other.

In one embodiment, the signal propagation measurement M2M_R and/or the left side is M2M_L are less than the signal propagation measurements M_RS_M and M_LS_M. For example, the signal propagation measurement M2M_R and/or the left side is M2M_L may be about 10 ns to about 30 ns, and the signal propagation measurements M_RS_M and M_LS_M may be about 80 ns to 100 ns.

In one embodiment, the programmable delay from the master IC chip 340 to the right slave IC chip 350 may be determined by:

$$R_{DLY}=0. \qquad \text{Equation 1}$$

In one embodiment, the programmable delay from the master IC chip 340 to the left slave IC chip 360 may be determined by:

$$L_{DLY}=0.5*(M\_RS\_M-M\_LS\_M). \qquad \text{Equation 2}$$

In one embodiment, the programmable delay on the loopback path of the master IC chip 350 may be determined by:

$$LP_{DLY}=0.5*(M\_RS\_M+T_{sync})=M2M\_R. \quad \text{Equation 3}$$

The left delay ($L_{DLY}$) may correspond to the difference in the propagation times for the routing of the right slave IC chip 350 and the left slave IC chip 360. Thus, the master IC chip 340 may be configured to generate a delay that corresponds to the delay in routing between the master IC chip 340 and the slave IC chips 350, 360. In one or more embodiments, the propagation times of the different sides of the master IC chip 340 may be used to further generate the programmable delay.

In one or more embodiments, the master-to-master loopback path (M2M_T) delay is about 2 touch-analog-control (TAC) clocks of delay. The TAC clock may be used by the sensor module 204 and sensor circuitry 206 to control acquisition of the sensor data from the sensor electrodes 205. Further, in various embodiments, M2M_T+$LP_{DLY}$ is equal to M2LS+$L_{DLY}$. Further, M2M_T may be a fixed delay of about 2, and $L_{DLY}$ may about 0, 0.5*MLSM=M2LS or TchipL+TglassL+TchipR+Tsync+2. Thus, $L_{DLY}$ may be equal to TchipL+TglassL+TchipR+Tsync. TglassL and TglassR corresponding to the routing delays between IC chips.

Figure 8B:
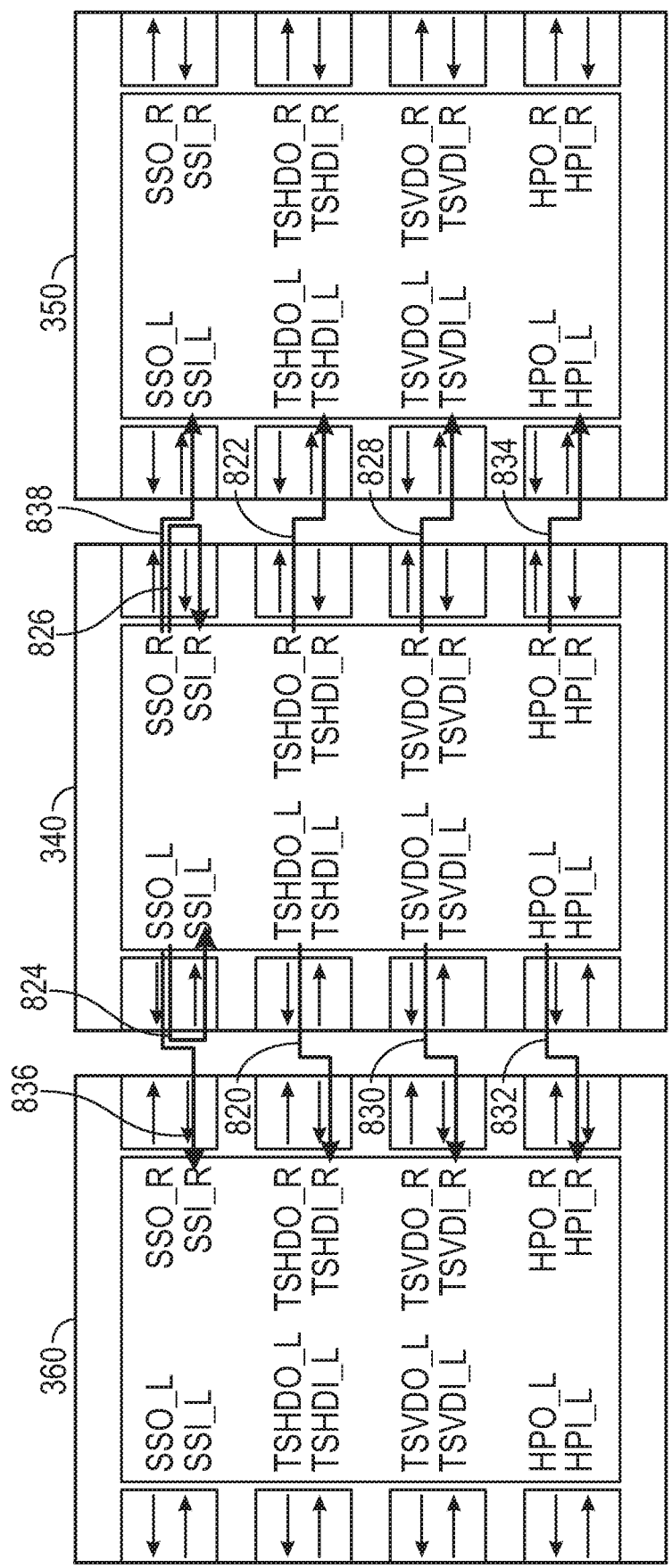

FIG. 8B illustrates the various signal paths between the master IC chip 340 and each slave IC chip (e.g., left slave IC chip 360 and right slave IC chip 350), according to one or more embodiments. For example, master IC chip 340 transmits tshd, tsvd, sense_sync_out and HSO calibration pulse out (hpo) signals to the slave IC chips 350, 360 via corresponding input/output pins on the master IC chip 340 and the slave IC chips 350, 360. In one embodiment, sense_sync_out signals are provided via signal paths 824, 826, 836 and 838. Tshd signals may be provided via signal paths 820, 822. Tsvd signals may be provided via signal paths 828, 830. The hpo signals may be provided via signal paths 832 and 834.

While four sets of input/output pin are used one either side of the master IC chip 340 to communicate with each of the slave IC chips 350, 360, in other embodiments, all of the input/output pins may be disposed along a common side of the master IC chip 340. Further, instead of one grouping of input/output pins being disposed along a side of the master IC chip 340, one or more sides of the master IC chip 340 may include multiple groupings of input/output pins. In such an embodiment, each grouping of pins corresponds to a different slave IC chip that may be coupled to the master IC chip 340.

In one or more embodiments, the master IC chip 340 may be configured to synchronize the high-speed-oscillator (HSO) circuits of the slave IC chips 350, 360. The HSO circuits may generate a HSO clock signal that is utilized by the digital circuits of the respective IC chips. In one embodiment, the TAC clock signal may be generated based on the HSO clock. Synchronizing the HSO clocks of the IC chips synchronizes capacitive sensing across all of the IC chips (e.g., 340, 350 and 360). In one embodiment, the HSO clocks may be calibrated to the substantially the same frequency. Each HSO clock may be calibrated to a frequency within about 0.2% tolerance with respect to one another. In other embodiments, each HSO clock is calibrated to a frequency within a tolerance other than 0.2% of each other such that errors are not introduced in the sensing data acquired from the sensor electrodes 205.

In one embodiment, to synchronize the HSO clocks, the master IC chip 340 transmits a periodic square wave signal 910 of programmable frequency to each of the slave IC chips 350, 360, for example via the Hcal_pulse_i/o pin (FIG. 3). The slave IC chips 350, 360 may use the square wave signal 910 as an accurate time base for the clock of the master IC chip 340. In one embodiment, a measurement period begins when each of the slave IC chip 350, 360 receives the first rising edge of the periodic square wave 910. The measurement period may correspond to a number of clock pulses of the clock of n each of the slave IC chips 350, 360 that occur before a falling edge is detected after the first rising edge. In one embodiment, each of the slave IC chips 350, 360 includes a register that is used to count the number of clock pulses. In one embodiment, the number of clock pulses is about 8. In other embodiments, other numbers of clock pulses may be utilized.

Figure 9:
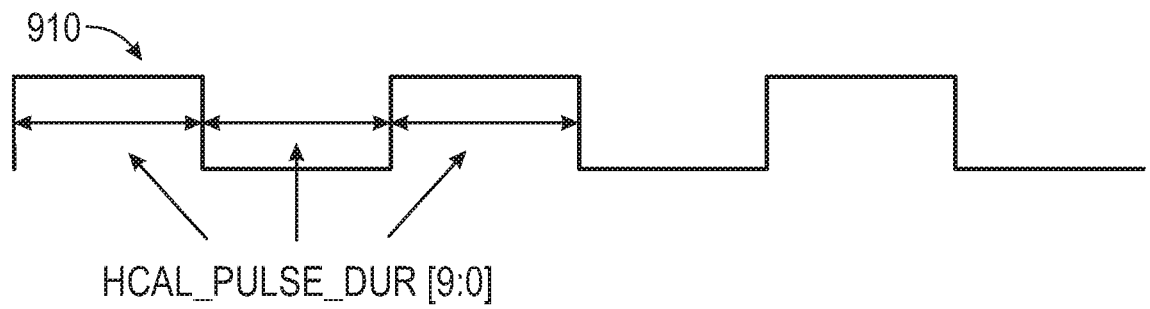
FIG. 9 illustrates a synchronization signal, according to one or more embodiments.

FIG. 9 illustrates an example periodic square wave 910. The half period of the square wave reference may be controlled by a HCAL_PULSE_DUR register of the master IC chip 340. In one embodiment, the HCAL_PULSE_DUR register is a 10 bit register. In other embodiments, registers having other sizes may be utilized. Equation 4 may be used to determine the frequency of the square wave pulse.

$$f_{hcal} = \frac{\text{HSO\_Clk}}{2(\text{HALF\_PULSE\_DUR})}. \quad \text{Equation 4}$$

In one embodiment, on the rising edge of the square wave, each slave IC chip 350, 360 begins counting the number of rising edges of the HSO clock of each respective slave IC chip. If the slave IC chip HSO clock is perfectly aligned with that of the master IC chip, the slave IC chip will measure 2*HALF_PULSE_DUR rising edges of its own HSO during one period of the square wave reference. The slave IC chip may be configured to count the number of its HSO rising edges over multiple periods of the square wave. The number of periods used to carry out this measurement is controlled by HSO_CALIB_TIME. The total number of rising edges of the HSO clock of the slave IC chip 350, 360 that occur during the measurement window is stored in a register called HSO_CALIB_CNT of the corresponding slave IC chip. The value of HSO_CALIB_CNT is governed by Equation 5:

$$\text{HSO\_CALIB\_CNT} = 2 * \text{HSO\_CALIB\_TIME} * \text{HCAL\_PULSE\_DUR} * \left(\frac{T_{masterHSO}}{T_{slaveHSO}}\right). \quad \text{Equation 5}$$

Each slave IC chip 350, 360 may measure HSO_CALIB_CNT during HSO calibration, and after dividing by the known terms, the slave IC chip is left with a measurement of $$\left(\frac{T_{masterHSO}}{T_{slaveHSO}}\right).$$

Thus, each or me stave IC chips determines the fractional error between the HSO clock and each respective slave IC chip and the HSO of the master IC chip. As such, each of the slave IC chips is able to correct for the HSO error by adjusting a register controlling the HSO clock of the slave IC chip. For example, each slave IC chip may adjust a frequency modulation (FMOD) register to adjust the HSO clock. In one embodiment, the FMOD register is configured to shift the frequency of the HSO clock. In one or more embodiments, the FMOD register is configured to apply shifts of one or more Hz, and/or KHz to the frequency of the HSO clock.

In one embodiment, when HSO_CALIB_CNT is 0, an indication that the slave IC chip didn't receive enough pulses from the master IC chip 340 to accurately perform HSO calibration may be generated. In one embodiment, HSO calibration is performed during power on of the IC chips, after a reset of the IC chips, after a power down of the IC chips, and/or after a number of sensing bursts have been completed. Further, HSO calibration may occur after a period of time to account for drift in the HSO clock of the either the master or slave IC chips. Further, tracking may be used to detect whether or not the slave or master clocks have drifted, and to initiate HSO calibration.

Figure 10:
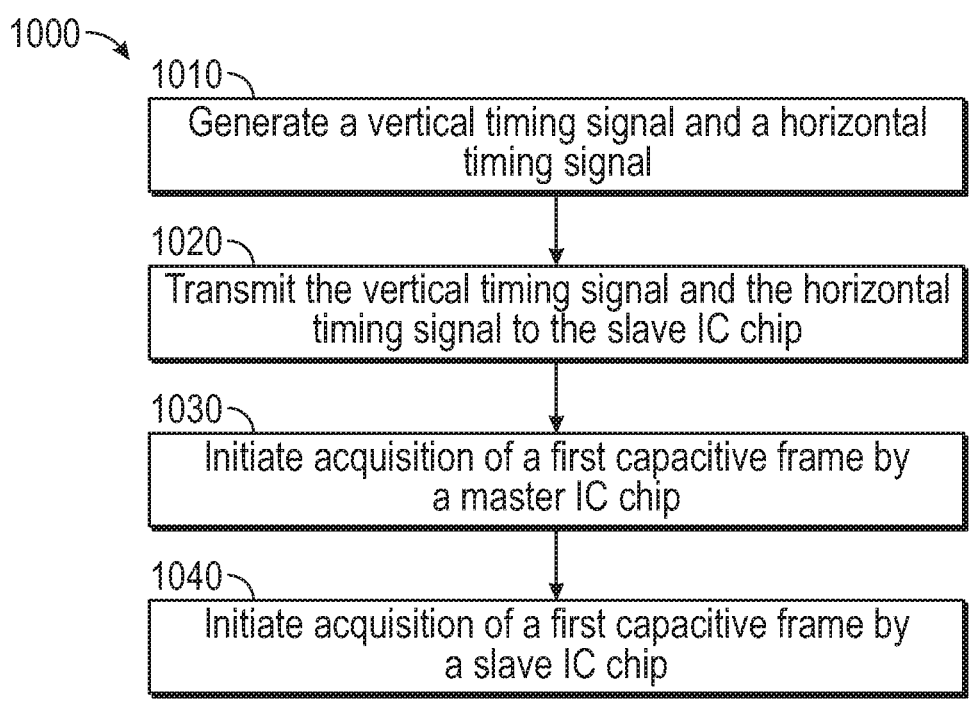
FIGS. 10, 11, 12, and 13 illustrate various methods for synchronizing integrated circuit chips, according to one or more embodiments.

FIG. 10 illustrates method 1000 for synchronizing a master IC chip (e.g., master IC chip 340) with a slave IC chip (e.g., slave IC chip 350, 360). At step 1010, a vertical timing signal (or tsvd) and a horizontal timing signal (or tshd) are generated. In one embodiment, the master IC chip 340 receives display data from a host processor, processes the display data and generates the vertical timing signal and the horizontal timing signal. The vertical timing signal may correspond to the start of a display frame and the horizontal timing signal may correspond to the start of a display line. Further, the vertical timing signal and the horizontal timing signal may include one or more pulses. In one or more embodiments, the vertical timing signal may be utilized by the master and slave IC chips to initiate a capacitive frame. At step 1020, the vertical timing signal and the horizontal timing signal are transmitted to the slave IC chip from the master IC chip. For example, the horizontal timing and vertical timing signals may be transmitted from input/output pins on the master IC chip 340 to corresponding pins on the slave IC chip 350 and/or 360.

At step 1030, the master IC chip initiates acquisition of a first capacitive frame. In one embodiment, the master IC chip 340 initiates acquisition of a first capacitive frame based on at least one a vertical timing signal a horizontal timing signal. For example, the master IC chip 340 may initiate acquisition of the first capacitive frame by detecting a rising edge of the vertical timing signal. The master IC chip may be configured to operate the sensor electrodes 205b for absolute capacitive sensing and/or transcapacitive sensing. For example, upon detection of a rising edge of the vertical timing signal, the master IC chip 340 drives each of the sensor electrodes 205b with an absolute capacitive sensing signal.

At step 1040, the slave IC chip initiates acquisition of a second capacitive frame. In one embodiment, the slave IC chip 350, 360 initiates acquisition of a second capacitive frame based on at least one the vertical timing signal the horizontal timing signal provided by the master IC chip 340. For example, the master IC chip 340 may communicate the vertical and horizontal timing signals to the slave IC chip 350. The slave IC chip receives vertical and horizontal timing signals and initiates acquisition of the second capacitive frame by detecting a rising edge of the vertical timing signal and driving a first one or more of sensor electrodes 205a with sensing signal 352 to operate the sensor electrodes 205a for transcapacitive sensing and/or absolute capacitive sensing. For example, upon detection of a rising edge of the vertical timing signal, the slave IC chip 350 drives each of the sensor electrodes 205a with an absolute capacitive sensing signal.

Figure 11:
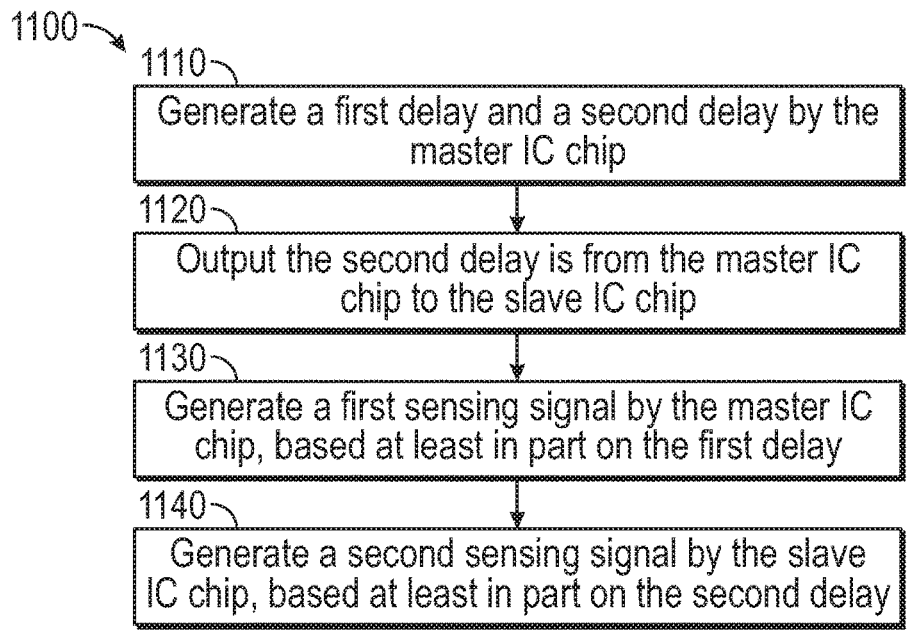

Method 1100 of FIG. 11 illustrates steps for synchronizing sensing signals of two or more IC chips. At step 1110, the master IC chip generates a first delay and a second delay. The first delay corresponds to a signal propagation measurement within the master IC chip and the second delay corresponds to a signal propagation measurement between the master IC chip and a slave IC chip. In one embodiment, the master IC chip transmits a first timing signal that is fed back into the master IC 350 chip via loopback path and received by the waveform generator of the master IC chip. The timing difference between when the timing signal is transmitted and then is received by the master IC chip 340 to determine the first delay. In one embodiment, the master IC chip 340 may be configured to initiate a counter when the timing signal is transmitted and stop the counter when the timing signal is received. The value of the counter may correspond to the first delay.

The second delay may be measured by transmitting a timing signal from the master IC chip 340 to the slave IC chip 350 and then back to the master IC chip 340. The difference in time from when the timing signal is transmitted from the master IC chip 340 and received by the master IC chip may be used to determine the second delay. In one embodiment, the master IC chip 340 may be configured to initiate a counter when the timing signal is transmitted to the slave IC chip and stop the counter when the timing signal is received.

At step 1120, the second delay is output from the master IC chip to the slave IC chip. For example, the second delay is output from the master IC chip 340 to the slave IC chip 350.

At step 1130, a first sensing signal is generated by the master IC chip, based at least in part on the first delay. The first delay may be used to delay when the first sensing signal 342 is output by the master IC chip 340 onto sensor electrodes 205b. In one embodiment, the first pulse of the first sensing signal 342 is delayed by the first delay.

Figure 12:
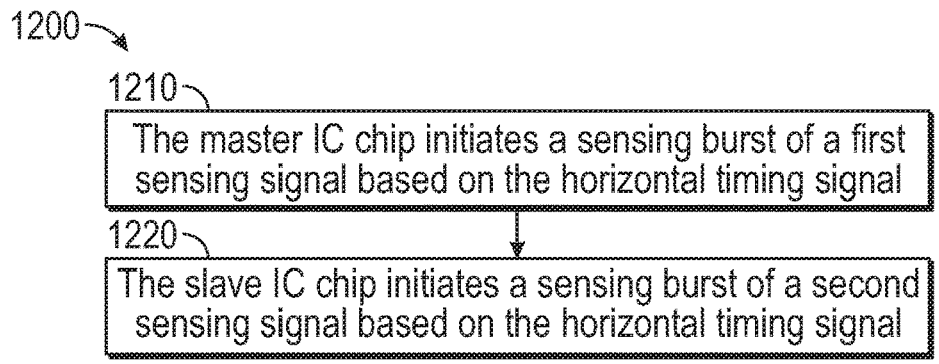

At step 1140, a second sensing signal is generated by the slave IC chip, based at least in part on the second delay. The second delay may be used to delay when the second sensing signal 352 is output by the slave IC chip 350. In one embodiment, the first pulse of the second sensing signal 352 is delayed by the second delay, such that sensor electrodes 205a, and 205b are driven at substantially the same time. For example, the difference in time between driving the sensor electrodes 205a and 205b is less than about 50 ns, FIG. 12 illustrates method 1200 for synchronizing sensing bursts between two or more IC chips. At step 1210, the master IC chip initiates a sensing burst of a first sensing signal based on the horizontal timing signal. For example, master IC chip 340 is configured to detect a rising edge of the horizontal timing signal and generate a first burst of sensing signal 342. The master IC chip 340 outputs the first sensing signal onto one or more sensor electrodes 205b.

At step 1220, the slave IC chip initiates a sensing burst of a second sensing burst. For example, slave IC chip 350 is configured to detect a rising edge of the horizontal timing signal and generate a first burst of sensing signal 352, and outputs the first sensing signal onto one or more sensor electrodes 205a. As the bursts of the first and second sensing signal are both initiated based on the horizontal timing signal of the master IC chip 340, initiation of the first and second sensing signals are synchronized.

Figure 13:
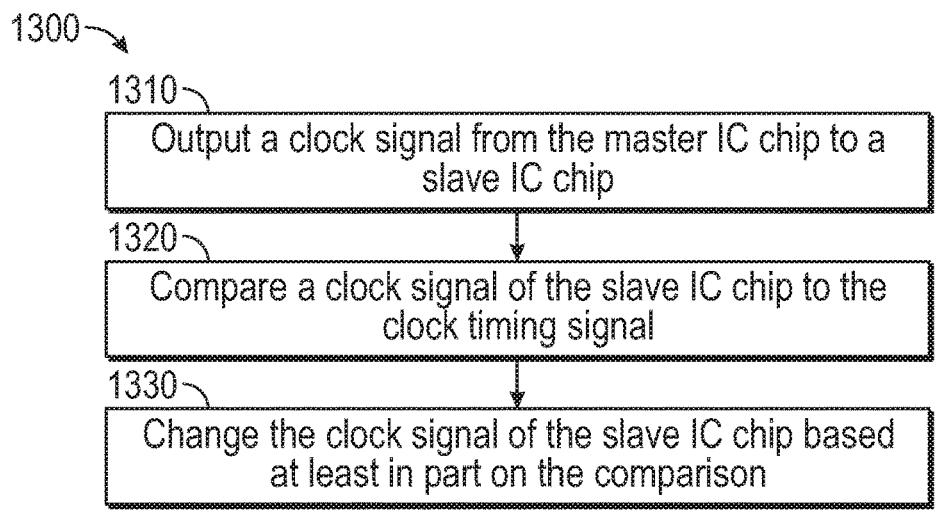

Method 1300 of FIG. 13 illustrates a method for synchronizing a clock signal of a master IC chip with the clock signal of a slave IC chip. At step 1310, a clock timing signal is output from the master IC chip to a slave IC chip. For example, master IC chip 340 may output the master IC chip's clock signal to the slave IC chip 350. At step 1320, the clock signal of the slave IC chip is compared with the clock timing signal. For example, slave IC chip 350 may be configured to detect a first rising edge of the clock timing signal and determine how many rising edges of the slave IC chip's clock signal occur before the falling edge of the clock timing signal is detect.

At step 1330, the clock signal of the slave IC chip is changed based on the comparison between the clock signal of the slave IC chip and the clock timing signal. For example, if the number of rising edges of the clock of the slave IC chip that occur between rising and falling edges of the clock timing signal is determined to have changed, the clock signal of the slave IC chip may be increased or decreased in frequency, respectively. For example, the frequency of the clock signal of the slave IC chip 350, 360 may be increased when the number of rising edges of the clock signal of the slave IC chip 350, 360 has been determined to have decreased. Alternatively, the frequency of the clock signal of the slave IC 350, 360 may be decreased when the number of rising edges of the clock signal of the slave IC chip 350, 360 has been determined to have increased.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

The invention claimed is:

1. An input device, comprising:
a display panel;
a plurality of sensor electrodes;
a master integrated circuit (IC) chip configured to:
drive a first respective portion of the display panel; and
operate a first respective portion of the sensor electrodes; and
a slave IC chip in communication with the master IC chip, wherein the slave IC chip is configured to:
drive a second respective portion of the display panel; and
operate a second respective portion of the sensor electrodes;
wherein the master IC chip is further configured to provide one or more synchronization signals to the slave IC chip for synchronization of display updating and capacitive sensing between the master IC chip and the slave IC chip;
wherein the master IC chip and the slave IC chip are configured to perform burst synchronization, wherein performing burst synchronization comprises:
generating, by the master IC chip, a first timing signal indicating the start of a capacitive sensing frame wherein the capacitive sensing frame comprises multiple bursts;
communicating, by the master IC chip, the first timing signal to the slave IC chip; and
generating, by both the master IC chip and the slave IC chip, respective sensing trigger event signals based on the first timing signal to maintain burst synchronization between the master IC chip and the slave IC chip.

2. The input device according to claim 1, wherein the master IC chip is configured to perform frame synchronization with the slave IC chip, wherein performing frame synchronization comprises:
generating a first timing signal indicating the start of a capacitive sensing frame and/or a display frame;
generating a second timing signal indicating the start of a display line of a display frame; and
communicating the first timing signal and the second timing signal to the slave IC chip.

3. The input device according to claim 2, wherein the master IC chip is configured to perform frame synchronization with the slave IC chip based on a reset of the master IC chip and/or the slave IC chip and/or based on a predetermined number of capacitive frames having occurred.

4. The input device according to claim 1, wherein performing burst synchronization further comprises:
generating, by the master IC chip, a second timing signal indicating the start of a display line of a display frame;
communicating, by the master IC chip, the second timing signal to the slave IC chip; and
generating, by both the master IC chip and the slave IC chip, additional respective sensing trigger event signals based on the second timing signal to maintain burst synchronization between the master IC chip and the slave IC chip.

5. The input device according to claim 1, wherein the master IC chip is configured to perform sensing cycle synchronization with the slave IC chip, wherein performing sensing cycle synchronization comprises:
tuning a programmable delay at the master IC chip; and
communicating a sensing synchronization signal to the slave IC chip based on the tuned programmable delay.

6. The input device according to claim 5, wherein tuning the programmable delay comprises performing delay calibration, wherein performing delay calibration comprises:
transmitting, by the master IC chip, a timing pulse along a loopback path within the master IC chip and along a round trip path to and back from the slave IC chip.

7. The input device according to claim 6, wherein performing delay calibration further comprises:
initiating, by the master IC chip, a delay calibration clock.

8. The input device according to claim 1, wherein the master IC chip and the slave IC chip are configured to perform high-speed-oscillator (HSO) synchronization, wherein performing HSO synchronization comprises:
transmitting, by the master IC chip, a periodic square wave signal to the slave IC chip; and
determining, by the slave IC chip, a number of clock pulses of an HSO of the slave IC chip that occur within a half period of the periodic square wave signal.

9. The input device according to claim 8, wherein the master IC chip and the slave IC chip are configured to perform HSO synchronization based on the master IC chip or the slave IC chip being powered on, based on the master IC chip or the slave IC chip being reset, and/or based on a predetermined number of sensing bursts having been completed.

10. An input device, comprising:
a display panel;
a plurality of sensor electrodes;

a master integrated circuit (IC) chip configured to:
   drive a first respective portion of the display panel; and
   operate a first respective portion of the sensor electrodes; and
a slave IC chip in communication with the master IC chip
   wherein the slave IC chip is configured to:
   drive a second respective portion of the display panel; and
   operate a second respective portion of the sensor electrodes;
wherein the master IC chip is further configured to provide one or more synchronization signals to the slave IC chip for synchronization of display updating and capacitive sensing between the master IC chip and the slave IC chip;
wherein the master IC chip is configured to perform sensing cycle synchronization with the slave IC chip, wherein performing sensing cycle synchronization comprises:
   tuning a programmable delay at the master IC chip; and
   communicating a sensing synchronization signal to the slave IC chip based on the tuned programmable delay;
wherein the master IC chip and the slave IC chip each comprise a waveform generator, and wherein based on the sensing cycle synchronization, the waveform generators of the master IC chip and the slave IC chip are synchronized to one another with respect to initiating the waveform generators at each half period.

11. An input device, comprising:
a display panel;
a plurality of sensor electrodes;
a master integrated circuit (IC) chip configured to:
   drive a first respective portion of the display panel; and
   operate a first respective portion of the sensor electrodes; and
a slave IC chip in communication with the master IC chip,
   wherein the slave IC chip is configured to:
   drive a second respective portion of the display panel; and
   operate a second respective portion of the sensor electrodes;
wherein the master IC chip is further configured to provide one or more synchronization signals to the slave IC chip for synchronization of display updating and capacitive sensing between the master IC chip and the slave IC chip;
wherein the master IC chip is configured to perform sensing cycle synchronization with the slave IC chip, wherein performing sensing cycle synchronization comprises:
   tuning a programmable delay at the master IC chip; and
   communicating a sensing synchronization signal to the slave IC chip based on the tuned programmable delay;
wherein tuning the programmable delay comprises performing delay calibration, wherein performing delay calibration comprises: transmitting, by the master IC chip, a timing pulse along a loopback path within the master IC chip and along a round trip path to and back from the slave IC chip;
wherein performing delay calibration further comprises:
   initiating, by the master IC chip, a counter based on transmission of the timing pulse;
   stopping, by the master IC chip, the counter based on reception of the timing pulse; and
   recording, by the master IC chip, a round trip propagation time corresponding to the timer.

12. An input device, comprising:
a display panel;
a plurality of sensor electrodes;
a master integrated circuit (IC) chip configured to:
   drive a first respective portion of the display panel; and
   operate a first respective portion of the sensor electrodes; and
a slave IC chip in communication with the master IC chip,
   wherein the slave IC chip is configured to:
   drive a second respective portion of the display panel; and
   operate a second respective portion of the sensor electrodes;
wherein the master IC chip is further configured to provide one or more synchronization signals to the slave IC chip for synchronization of display updating and capacitive sensing between the master IC chip and the slave IC chip;
wherein the master IC chip and the slave IC chip are configured to perform high-speed-oscillator (HSO) synchronization, wherein performing HSO synchronization comprises:
   transmitting, by the master IC chip, a periodic square wave signal to the slave IC chip; and
   determining, by the slave IC chip, a number of clock pulses of an HSO of the slave IC chip that occur within a half period of the periodic square wave signal;
wherein performing HSO synchronization further comprises:
   determining, by the slave IC chip, a fractional error between the HSO of the slave IC chip and an HSO of the master IC chip; and
   adjusting, by the slave IC chip the HSO of the slave IC chip based on the determined fractional error.

13. A method for operating a master integrated circuit (IC) chip of an input device having a display panel and a plurality of sensor electrodes, the method comprising:
   driving, by the master IC chip, a respective portion of the display panel;
   operating, by the master IC chip, a respective portion of the sensor electrodes; and
   providing, by the master IC chip, one or more synchronization signals to a slave IC chip of the input device for synchronization of display updating and capacitive sensing between the master IC chip and the slave IC chip;
wherein the method further comprises:
   performing, by the master IC chip, burst synchronization with the slave IC chip, wherein performing burst synchronization comprises:
      generating a first timing signal indicating the start of a capacitive sensing frame, wherein the capacitive sensing frame comprises multiple bursts;
      communicating the first timing signal to the slave IC chip; and
      generating a sensing trigger event signal based on the first timing signal to maintain burst synchronization between the master IC chip and the slave IC chip.

14. The method according to claim 13, further comprising:
   performing, by the master IC chip, frame synchronization with the slave IC chip, wherein performing frame synchronization comprises:
      generating a first timing signal indicating the start of a capacitive sensing frame and/or a display frame;

generating a second timing signal indicating the start of a display line of a display frame; and communicating the first timing signal and the second timing signal to the slave IC chip.

15. The method according to claim 13, further comprising:

performing, by the master IC chip, sensing cycle synchronization with the slave IC chip, wherein performing sensing cycle synchronization comprises:

tuning a programmable delay at the master IC chip; and communicating a sensing synchronization signal to the slave IC chip based on the tuned programmable delay.

16. The method according to claim 13, further comprising:

performing, by the master IC chip, high-speed-oscillator (HSO) synchronization with the slave IC chip, wherein performing HSO synchronization comprises:

transmitting, by the master IC chip, a periodic square wave signal to the slave IC chip.

17. A method for operating a slave integrated circuit (IC) chip of an input device having a display panel and a plurality of sensor electrodes, the method comprising:

driving, by the slave IC chip, a respective portion of the display panel;

operating, by the slave IC chip, a respective portion of the sensor electrodes; and receiving, by the slave IC chip, one or more synchronization signals from a master IC chip of the input device for synchronization of display updating and capacitive sensing between the master IC chip and the slave IC chip;

wherein the method further comprises:

performing, by the slave IC chip, burst synchronization with the master IC chip, wherein performing burst synchronization comprises:

receiving a first timing signal from the master IC chip indicating the start of a capacitive sensing frame wherein the capacitive sensing frame comprises multiple bursts; and generating a sensing trigger event signal based on the first timing signal to maintain burst synchronization between the master IC chip and the slave IC chip.

18. The method according to claim 17, further comprising:

performing, by the slave IC chip, frame synchronization with the master IC chip, wherein performing frame synchronization comprises:

receiving a first timing signal from the master IC chip indicating the start of a capacitive sensing frame and/or a display frame; and receiving a second timing signal from the master IC chip indicating the start of a display line of a display frame.

19. The method according to claim 17, further comprising:

performing, by the slave IC chip, sensing cycle synchronization with the master IC chip, wherein performing sensing cycle synchronization comprises:

receiving a sensing synchronization signal from the master IC chip, wherein the sensing synchronization signal is based on a programmable delay tuned at the master IC chip.

20. The method according to claim 17, further comprising:

performing, by the slave IC chip, high-speed-oscillator (HSO) synchronization with the master IC chip, wherein performing HSO synchronization comprises:

receiving a periodic square wave signal from the master IC chip; and determining a number of clock pulses of an HSO of the slave IC chip that occur within a half period of the periodic square wave signal.

* * * * *